United States Patent
Wan et al.

(10) Patent No.: US 8,014,668 B2
(45) Date of Patent: Sep. 6, 2011

(54) METHOD AND SYSTEM FOR DISTRIBUTED MEASUREMENT AND COMPENSATION OF CHROMATIC DISPERSION IN AN OPTICAL NETWORK

(75) Inventors: Ping Wai Wan, Kanata (CA); Derrick Remedios, Ottawa (CA); Patrick Chilufya Chimfwembe, Kanata (CA); Colin Geoffrey Kelly, Ottawa (CA); James Benson Bacque, Ottawa (CA)

(73) Assignee: Alcatel Lucent, Paris (FR)

( * ) Notice: Subject to any disclaimer, the term of this patent is extended or adjusted under 35 U.S.C. 154(b) by 900 days.

(21) Appl. No.: 12/017,041

(22) Filed: Jan. 20, 2008

(65) Prior Publication Data
US 2010/0283996 A1    Nov. 11, 2010

Related U.S. Application Data

(60) Provisional application No. 60/885,909, filed on Jan. 21, 2007.

(51) Int. Cl.
*H04B 10/00* (2006.01)
*H04B 10/08* (2006.01)
*H04B 10/12* (2006.01)
*H04J 14/08* (2006.01)

(52) U.S. Cl. .......... 398/16; 398/29; 398/31; 398/33; 398/81; 398/147; 398/159

(58) Field of Classification Search ........... 398/9, 16, 398/22, 25, 28, 30–34, 58, 81, 147, 158, 398/159, 194

See application file for complete search history.

(56) References Cited

U.S. PATENT DOCUMENTS
6,732,058 B2   5/2004   Jin
6,963,892 B2   11/2005  Jin
(Continued)

FOREIGN PATENT DOCUMENTS
WO   WO 02/090944   11/2002

OTHER PUBLICATIONS

Schlager J B et al "Precise laser-based measurements of zero dispersion wavelenght in single-mode fibers", Optical Fiber Communications, 1996. OFC '96 Feb. 25, 1996-Mar. 1, 1996, Piscataway, NJ, USA, IEEE, Feb. 25, 1996 pp. 293-294, ISSN: 978-1-55752-422-5.

(Continued)

*Primary Examiner* — Dalzid Singh
(74) *Attorney, Agent, or Firm* — IP-MEX Inc.

(57) ABSTRACT

A method and apparatus for distributed measurement of chromatic dispersion in an optical network is disclosed. The network comprises optical switching nodes interconnected by optical links. An optical link may comprise multiple spans, each span ending in a transport module which comprises signal-processing components. At least one optical switching node has a probing signal generator transmitting an optical probing signal along a selected path in the network. Probing-signal detectors placed at selected transport modules determine chromatic-dispersion values and send results to a processing unit which determines appropriate placement of compensators or appropriate adjustments of compensators placed along the path. A preferred probing signal has the form of wavelength modulated optical carrier which is further intensity modulated by a periodic, preferably sinusoidal, probing tone. Variation in the phase-shift of the probing tone corresponding to variation of the wavelength of the optical probing signal determines chromatic-dispersion characteristics for different spans of the path.

34 Claims, 21 Drawing Sheets

U.S. PATENT DOCUMENTS

| | | | |
|---|---|---|---|
| 6,968,131 | B2 | 11/2005 | Obeda |
| 7,031,606 | B2 | 4/2006 | Liu |
| 7,054,556 | B2 | 5/2006 | Wan |
| 7,142,783 | B2 | 11/2006 | Obeda |
| 7,155,122 | B2 | 12/2006 | Wan |
| 7,158,723 | B2 | 1/2007 | Wan |
| 2003/0002112 | A1* | 1/2003 | Hirano et al. ................ 359/161 |
| 2003/0215238 | A1* | 11/2003 | Milton et al. .................. 398/83 |
| 2004/0057375 | A1* | 3/2004 | Shiragaki et al. ............. 370/216 |

OTHER PUBLICATIONS

Anonymous: "FOTP-175 Chromatic Dispersion Measurement of Single-mode Optical Fibers by the Differential Phase Shift Method; (Revision of EIA/TIA-455-175;TIA/EIA-455-175-A" Telecommunications Industry Association (TIA) Nov. 1992.

Cohen Leonard G "Comparison of Single-Mode Fiber Dispersion Measurement Techniques" Journal of Lightwave Technology, IEEE Service Center, New York, NY, US, vol. LT-3, No. 5, Oct. 1, 1985, pp. 958-966, XP002157422 ISSN: 0733-8724.

Barlow et al "Technique for Direct Measurement of Single-Mode Fiber Chromatic Dispersion" Journal of Lightwave Technology vol. LT-5, No. 9, Sep. 1987, pp. 1207-1213, XP002493638.

* cited by examiner

METHOD AND SYSTEM FOR DISTRIBUTED MEASUREMENT AND COMPENSATION OF CHROMATIC DISPERSION IN AN OPTICAL NETWORK

CROSS-REFERENCE TO RELATED APPLICATIONS

This application claims priority to U.S. provisional application 60/885,909 to Wan et al entitled "Method and System for Distributed Measurement and Compensation of Chromatic Dispersion in Optical Networks", which was filed on Jan. 21, 2007, which is incorporated herein by reference.

FIELD OF THE INVENTION

The invention relates to optical networks, and in particular, to a method and system for distributed measurement and compensation of chromatic dispersion in an optical network.

BACKGROUND OF THE INVENTION

Chromatic dispersion is caused by material dispersion, resulting from variation in the refractive index of an optical material, and waveguide dispersion, resulting from changes in the distribution of light between the core and the cladding of a single mode fiber. Accurate measurement of chromatic dispersion in optical transmission networks is of paramount importance to enable proper compensation. Chromatic dispersion results in different propagation speeds for optical signals of different wavelengths, which in turn causes temporal spread of optical signals and limits the reach of an optical link and the data rate carried by a wavelength channel within the link. Therefore, determining and compensating chromatic dispersion are necessary for realizing large-scale wide-coverage optical networks supporting data streams of high bit rates.

Traditional methods of compensating for chromatic dispersion include measuring individual fiber spans in an optical network using external dispersion measurement equipment and applying pre-defined and granular dispersion compensation devices at pre-determined points in the optical network. Such methods usually require a high-speed external modulator and external access to a fiber span under test in order to perform the chromatic-dispersion measurement, and are therefore inefficient, intrusive and labor intensive.

Therefore, there is a need for developing alternative methods and systems for measuring and compensating chromatic dispersion which aim at avoiding or mitigating the above-mentioned drawbacks.

SUMMARY OF THE INVENTION

The invention provides a method and a system for distributed measurement of chromatic dispersion, and for determining appropriate compensation levels, in an optical network In accordance with one embodiment, the present invention provides a system for measuring chromatic dispersion in a link comprising multiple spans. The system comprises a processing unit, a probing-signal generator, and a plurality of probing-signal detectors each preferably collocated with a transport module of one of the spans. The probing-signal generator comprises at least one laser source for producing a probing optical signal and an amplitude modulator for intensity modulating the probing optical signal with a periodic tone of a predetermined frequency. During each of successive time intervals within a prescribed period, the probing optical signal has a predefined wavelength selected from a set of prescribed wavelengths.

Each probing-signal detector comprises a demodulator for detecting segments of the periodic tone during successive time intervals, a circuit for measuring phase differences between the segments, and a transmitter for sending an output of the circuit to the processing unit.

The processing unit determines chromatic dispersion between wavelengths corresponding to successive time intervals according to the measured phase differences, the set of prescribed wavelengths, and the predetermined frequency.

The system further comprises a plurality of adjustable chromatic-dispersion compensators each collocated with a respective transport module of a span and communicatively coupled to the processing unit for receiving target compensation values.

The probing-signal generator may include one tunable wavelength modulated laser source. Alternatively, the probing-signal generator may include multiple laser sources and a temporal selector to select an output of one of the multiple laser sources during each of the successive time intervals.

The periodic signal is preferably sinusoidal. However, periodic signals of other waveforms such as a square-wave or a saw-tooth waveform may be used.

In accordance with another embodiment, the present invention provides a network comprising: a plurality of optical switching nodes; a plurality of transport modules; a plurality of fiber-optic links interconnecting the switching nodes; a plurality of probing-signal generators; and a plurality of probing-signal detectors.

Each link comprises at least one span, and each span terminates in one of the transport modules. Each probing-signal generator is associated with a selected switching node. A probing-signal detector may be collocated with a respective transport module.

The network further comprises a first controller for directing a first probing signal, produced by a first probing-signal generator associated with a first switching node, to a first route traversing at least one probing-signal detector. A processing unit receives outputs of the probing-signal detectors and determines appropriate chromatic-dispersion compensation values.

The first probing-signal generator comprises a tunable laser and an intensity modulator. The tunable laser produces a periodic optical signal having different wavelengths during successive time intervals within a prescribed period the periodic optical signal. The intensity modulator modulates the periodic optical signal with a sinusoidal tone of a predetermined frequency. The successive wavelengths of the periodic optical signal are selected from an ordered set of prescribed wavelengths.

A probing signal detector comprises: a demodulator for detecting segments of the sinusoidal tone during the successive time intervals; a circuit for measuring phase differences between the segments; and a transmitter for sending an output of the circuit to the processing unit.

The processing unit determines chromatic dispersion between wavelengths corresponding to the successive time intervals according to the measured phase differences, the set of prescribed wavelengths, and the predetermined frequency. The processing unit determines cumulative chromatic dispersion along overlapping parts of the first route from the first switching node to each of the at least one probing-signal detector.

A transport module may comprise a probing-signal detector from among the plurality of probing-signal detectors.

Consequently, the processing unit may determine chromatic dispersion for each span along a selected route.

The first controller may also direct a second probing signal, produced by the first probing-signal generator to a second route traversing at least one probing-signal detector.

The first switching node may comprise a second probing-signal generator and the first controller, associated with the first switching node, may direct a second probing signal produced by the second probing-signal generator to another route traversing at least one probing-signal detector. The first and second probing signals may be sent concurrently.

The network may further comprise a probing-signal generator and a controller associated with a second switching node, and a probing signal may be directed to a route starting from the second switching node.

The network further comprises a plurality of adjustable chromatic-dispersion compensators each collocated with a respective transport module and communicatively coupled to the processing unit for receiving target compensation values.

The processing unit has a communication path to a switching node supporting a probing-signal generator to communicate descriptors of probing signals, and each transport module has a communication path to the processing unit to report phase measurements. A communication path from the processing unit to a switching node, and a communication path from a transport module to the processing unit, may be dedicated paths or switched paths through a data network. Additionally, the network may comprise optical supervisory channels for communicating control data between a switching node and transport modules along routes emanating from the switching node.

In accordance with a further aspect, the present invention provides a method for distributed measurement of chromatic-dispersion in a network comprising a plurality of optical switching nodes. The method comprises steps of: selecting a path originating from a first switching node; sending from the first switching node a probing optical signal combined with operational optical signals; and detecting the probing tone at a selected probing-signal detector placed along the path.

The probing optical signal comprises segments each having a selected wavelength, from a set of wavelengths, during successive time intervals. The probing optical signal is modulated by a periodic probing tone of a predetermined frequency. Upon detecting the probing tone, phase differences between successive parts of the probing tone, each part corresponding to a segment of the probing optical signal, are determined. A phase difference between two parts of the probing tone is determined from measuring a phase value of each part with respect to some phase reference. Chromatic dispersion along the path between the first switching node and the probing-signal detector is determined for pairs of the wavelengths according to the phase differences and the predetermined frequency. The set of wavelengths includes wavelengths selected to be spectrally distinct from the operational optical signals.

The steps of detecting and determining chromatic dispersion are repeated at each of a plurality of probing-signal detectors placed along the path.

The probing optical signal is periodic with a sequence of m>1 segments repeated over successive periods each of duration T, each segment having a wavelength selected from the set of wavelengths. The m segments occupy respective time intervals $\tau_j$, $1 \leq j \leq m$, where each time interval comprises a respective number of time windows each of duration $\sigma$.

The method further comprises a step of determining phase differences between parts of the probing tone during successive time windows. In order to relate a time window to one of the segments of the probing optical signal, the probing-signal detector performs a step of identifying the starting instant of each interval within each period of the periodic probing optical signal. One of two techniques may be adopted.

In the first technique, the probing optical signal is suppressed at the first switching node for a duration equal to a predefined integer multiple of the time-window duration $\sigma$ at the starting instant of each period of duration T. A suppression time of $2\sigma$ is adequate. Consequently, the probing-signal detector senses a marked change in the amplitude of the detected probing tone and identifies a starting instant of each period of the probing optical signal, which is the starting instant of the first segment of the m segments constituting a period. With the period divided into m equal intervals, each time window can be related to a segment and a corresponding wavelength. Phase values made during time windows in the vicinity of the starting instant of each period of the probing optical signal are irrelevant, due to suppression of the probing optical signal, and are discarded. For example, with a suppression time of k time windows, phase values determined during (k+1) time windows are discarded. The number of time windows per interval is substantially larger than k. The phase values corresponding to each segment, i.e., corresponding to each of the m time intervals, are processed to determine a phase estimator for each segment. An arithmetic mean of phase values corresponding to a segment (corresponding to a wavelength) is an adequate estimator.

In the second technique the time intervals $\tau_j$, $1 \leq j \leq m$, are selected to have distinctly different values, and the probing optical signal is suppressed at the first switching node for a duration equal to a predefined integer multiple of the time-window duration $\sigma$ at the start of each of the time intervals. Thus, upon sensing a marked change in the amplitude of the probing tone, the starting instant of each segment (each time interval) is identified. Each segment of the probing optical signal may then be identified according to time lapse between successive starting instants. Phase values made during time windows in the vicinity of the starting instant of each time interval (each segment) of the probing optical signal are irrelevant and, hence, discarded. The remaining phase values corresponding to each segment are processed to determine a phase estimator for each segment.

The step of detecting comprises a step of amplitude demodulation to produce an envelope of a sum of the probing optical signal and the operational optical signals, followed by filtering the envelope to retain spectral components in a frequency band containing the probing tone. A phase value of the probing tone during a time window may be determined according to either of two approaches. The first approach is based on generating orthogonal components of a reference periodic signal of a frequency equal to the frequency of the probing tone, multiplying the envelope with each the orthogonal components, and integrating a product of multiplication. The second approach is based on determining a Fourier Transform of the envelope.

The method further comprises a step of determining chromatic-dispersion adjustments at selected points along the path based on chromatic-dispersion values determined at the plurality of probing-signal detectors placed along the path. The method applies to several other paths emanating from the first switching node, as well as paths emanating from other switching nodes.

BRIEF DESCRIPTION OF THE DRAWINGS

Embodiments of the present invention will be further described with reference to the accompanying exemplary drawings, in which.

DETAILED DESCRIPTION

Terminology

Figure 1:
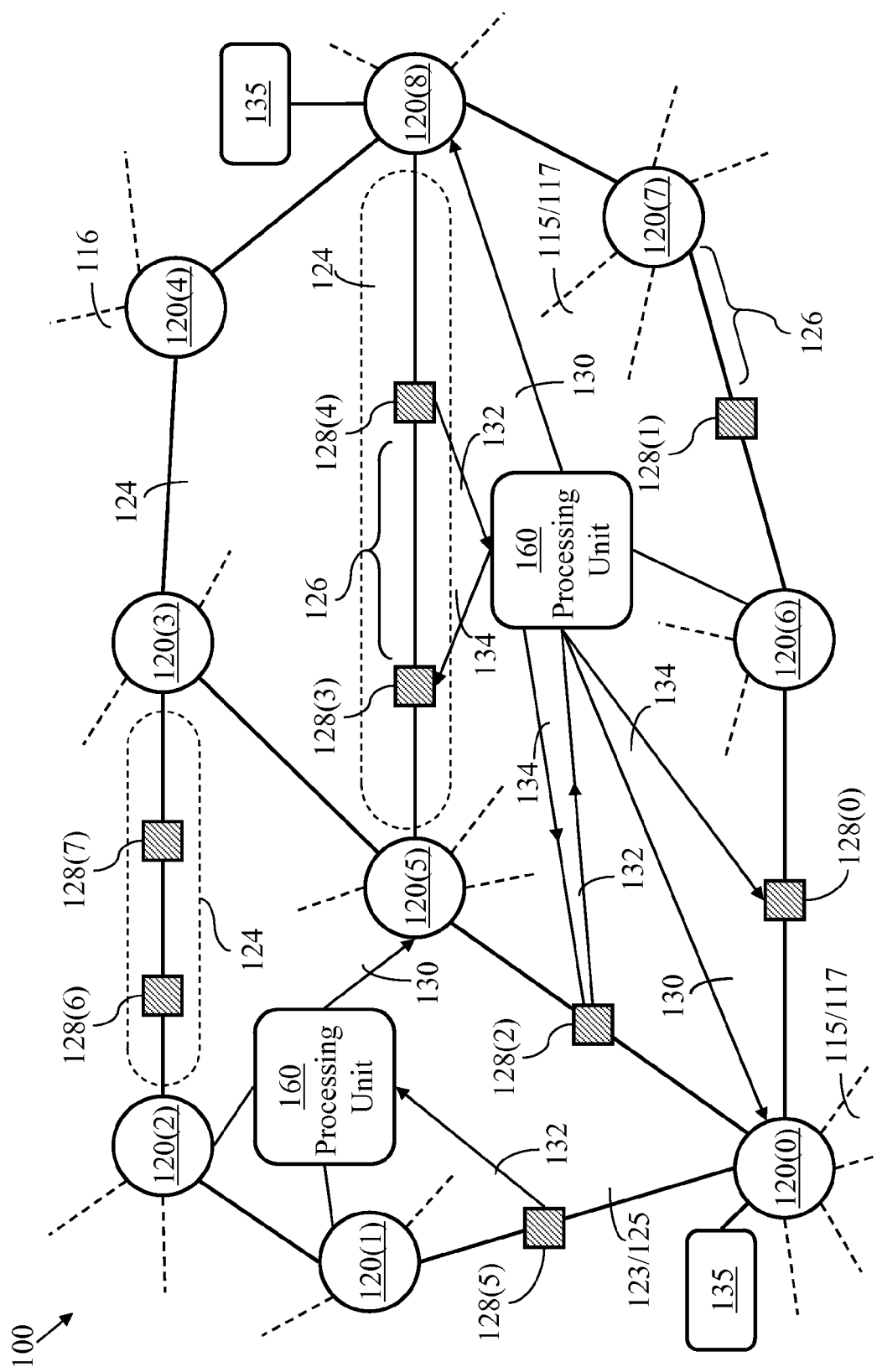
FIG. 1 illustrates a network comprising optical nodes interconnected by wavelength-division-multiplexed (WDM) links and including generators of probing signals, detectors of probing signals, and processing units in accordance with an embodiment of the present invention.

Optical switching node: An optical switching node is a device for receiving optical signals from at least two input channels and directing each received optical signal to one of at least two output channels. The optical switching node considered herein may take the form of a space switch or a wavelength-channel add-drop multiplexer. The input channels may comprise channels arriving from another switching node and sharing input wavelength division multiplexed (WDM) links as well as channels from local data sources. The output channels may comprise channels directed to another switching node and sharing output WDM links as well as output channels leading to local data sinks. Herein, an optical switching node may be referenced as a "switching node" for brevity.

Optical Add-drop multiplexer: An optical add-drop multiplexer is a simplified optical switching node accommodating a small number of WDM links and often used in ring networks.

Transport module: A transport module is a device used for processing optical signals received from input wavelength channels and placing the processed optical signals to output wavelength channels having one-to-one correspondence to the input wavelength channels. The signal-processing function may include overall amplification or wavelength selective gain control. A transport module may include a probing-signal detector and/or a chromatic-dispersion compensator. A transport module does not perform wavelength switching functions; however, it may be equipped with interfaces for exchanging control signals with other network elements. A transport module is a stand-alone device placed along a link between two switching nodes. Each switching node, however, comprises an embedded transport module.

Wavelength tracking unit: A wavelength tracking unit used in the network of the present invention has a primary function of ensuring proper routing of each carried optical signal. The unit may be further provided with a capability to measure optical power.

Carrier signal: The term carrier signal is used to indicate an optical signal of a single frequency (single wavelength).

Information signal: An information signal refers to a "payload" signal modulating a carrier signal. A typical information signal is a digital signal of 2.5 or 10 Gigabits per second.

Identifying signal: An identifying signal is a specific signal used to modulate a carrier signal in order to identify the carrier signal as it propagates through switching node to ensure proper routing.

Signature: An identifying signal is often referenced as a "signature" to emphasize its role in tracking (modulated) carrier signals.

Operational optical signals: An optical-carrier signal modulated by information signals, where the information signals may be of a digital or analog form, is called an operational optical signal. An operational optical signal may be further modulated by optical signatures (dither tones) for the purpose of identification or power-level monitoring as the signal propagates in the network.

Wavelength channel: A modulated carrier signal occupies an optical-frequency band (a wavelength band) within the bandwidth of a fiber link. The occupied band is called a "wavelength channel" or a "channel".

Operational wavelength channel: A wavelength channel corresponding to an operational optical signal is called an operational wavelength channel.

Probing optical signal: A probing optical signal is a signal devised to enable measuring chromatic dispersion along a path without interfering with other "payload" optical signals sharing a link. In the present application, the preferred probing optical signal comprises a wavelength modulated optical carrier which is further amplitude modulated by a periodic probing tone, preferably of a sinusoidal waveform.

Probing tone: A probing tone is a periodic signal that modulates the intensity of a wavelength modulated optical carrier to enable quantifying propagation-delay variation with wavelength. The probing tone has a relatively low frequency, in comparison with the spectral content of information signals carried by operational wavelength channels within a shared link. A probing signal is preferably of a sinusoidal waveform.

Link: A link is a transmission medium connecting one switching node to another switching node. A WDM link may comprise several wavelength channels.

Dual link: A dual link is a bidirectional link comprising two links of opposite directions connecting two network elements.

Dual channel: A dual channel (wavelength channel) comprises two channels of opposite directions within a dual link.

Span: A link may comprise a concatenation of fiber-optic spans; a transport module connects two spans.

A path: A path comprises a wavelength channel in each of a series of links connecting a first (source) switching node to a second (destination) switching node.

Optical Network with Channel Monitoring Capability

FIG. 1 illustrates an exemplary network 100 in which the present invention may be deployed. The network 100 comprises a plurality of optical switching nodes 120, individually identified as 120(0), 120(1), etc., interconnected by optical wavelength division multiplexed (WDM) fiber links 124. Links 124 may be unidirectional or bidirectional. A fiber link 124 may comprise a number of spans 126, each span 126 ending in a transport module 128. For example, link 124 connecting switching node 120(5) to 120(8) has three spans. The transport module of the last span 126 of a link 124 may be embedded in the optical switching node 120 at which the link terminates. A link may have a single span, such as the link connecting switching node 120(1) to switching node 120(2) and the link connecting switching node 120(7) to switching node 120(8). The transport modules 128 are individually identified as 128(0), 128(1), etc. An optical switching node 120 may have dual channel 115/117 comprising a channel 115 from another node or from data sources and a channel 117 to another node or to data sinks.

A switching node 120 may have several dual links 124 to neighboring switching nodes 120. A dual link 124 comprises an input link 123 and an output link 125. A switching node 120 may have a probing-signal generator 135 for producing a test signal, herein called a probing optical signal, having different wavelengths during successive time intervals. The signal segments of different wavelengths experience different propagation delays along a path under test, thus enabling measurement of chromatic-dispersion as a function of wavelength. A switching node 120 may have one probing-signal generator to be shared by a number of links emanating from the node or multiple probing-signal generators which may be shared by links or dedicated to respective links. Exemplary network 100 includes two probing-signal generators 135 associated with switching nodes 120(0) and 120(8). The probing-signal generator 135 associated with switching node 120(0) may be used for chromatic-dispersion measurements of numerous routes originating from switching node 120(0). For example, measurements over paths: {120(0), 120(6), 120 (7), 120(8)}; {120(0), 120(5), 120(8)}; {120(0), 120(5), 120 (3), 120(4), 120(8)}; and {120(0), 120(1), 120(2), 120(3)} may be based on optical probing signals generated by the same probing-signal generator 135 of switching node 120(0). Likewise, measurements over paths: {120(8), 120(7), 120(6), 120(0)}; {120(8); 120(5); 120(0)}; {120(8), 120(4), 120(3), 120(5)}; and {120(8), 120(4), 120(3), 120(2), 120(1), 120 (0)} may be based on optical probing signals generated by the same probing-signal generator 135 of switching node 120(8).

In a network 100 of wider coverage, a switching node 120 may support more than one probing-signal generator as will be described with reference to FIG. 16, so that more paths can be tested concurrently. Alternatively, a probing-signal generator 135 may be provided in each of a larger number of switching nodes.

A probing signal generator 135 may be directly connected to a processing unit 160, through a dedicated communication channel or through a shared network, such as the Internet. Alternatively, a controller of a host switching node 120 supporting a probing-signal generator 135 may be communicatively coupled to a processing unit 160 and to the probing signal generator 135.

The transport modules 128 divide a link 124 into a number of spans 126. A fiber link 124 connecting a first switching node 120 to a second switching node 120 may comprise multiple spans 126 where a first span connects the first switching node 120 to a first transport module 128. If the fiber link traverses only one transport module 128, a second span connects the transport module 128 to the second switching node 120. Otherwise, the second span connects a first transport module 128 to a second transport module 128, and a third span 126 connects the second transport module 128 to either the second switching node 120 or to a third transport module 128, if any, and so on. A transport module 128 may include a probing-signal detector and/or a chromatic-dispersion compensator (not illustrated).

Network 100 further comprises at least one processing unit 160, each for receiving measurements of chromatic dispersion and determining appropriate compensation adjustments. Each switching node 120 supporting a probing-signal generator 135 has a control channel 130 from a processing unit 160 for receiving descriptors of a probing signal. Control channel 130 is preferably a dual (bidirectional) channel. Each transport module 128 having a probing-signal detector has a control channel 132 to a processing unit 160 to report chromatic-dispersion measurements. Each transport module 128 having a chromatic-dispersion compensator has a control channel 134 from a processing unit 160 for receiving compensation adjustments. The network 100 may comprise more than one processing unit 160. The functions of a probing-signal generator 135, a probing-signal detector, and a processing unit 160 will be described below with reference to FIG. 6.

Figure 2:
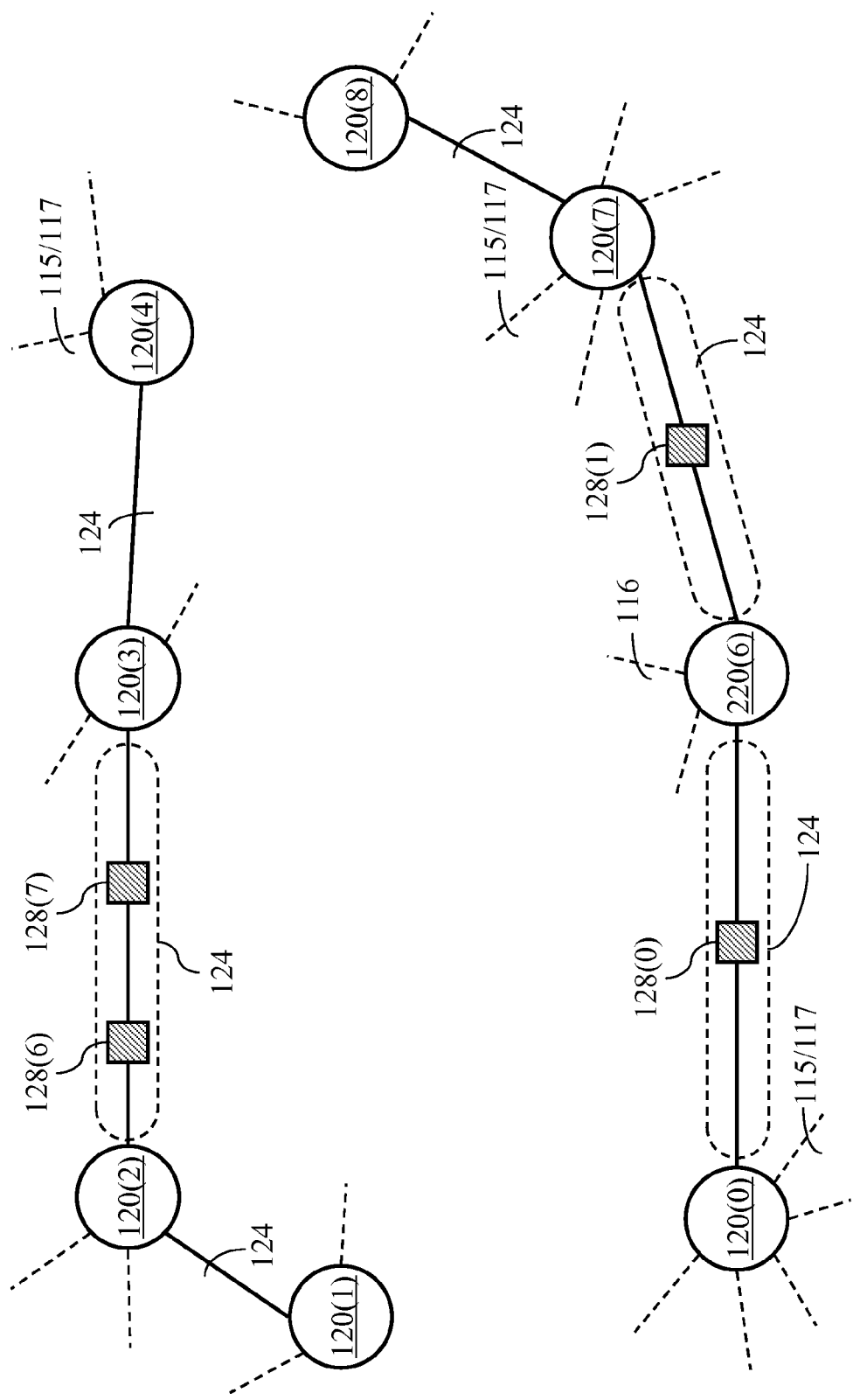
FIG. 2 illustrates paths in the network of FIG. 1 for illustrating a method of distributed measurement of chromatic dispersion in accordance with an embodiment of the present invention.

Measurements of chromatic dispersion may be performed over an individual link 124 connecting two nodes 120, or over a path comprising more than one link. The measurements over individual links may be carried-out concurrently. Measurement over multi-link non-intersecting paths may also be performed concurrently. FIG. 2 illustrates two non-intersecting paths in network 100 over which chromatic-dispersion measurements and measurement analysis to determine appropriate compensation measures may be carried out concurrently.

Figure 3:
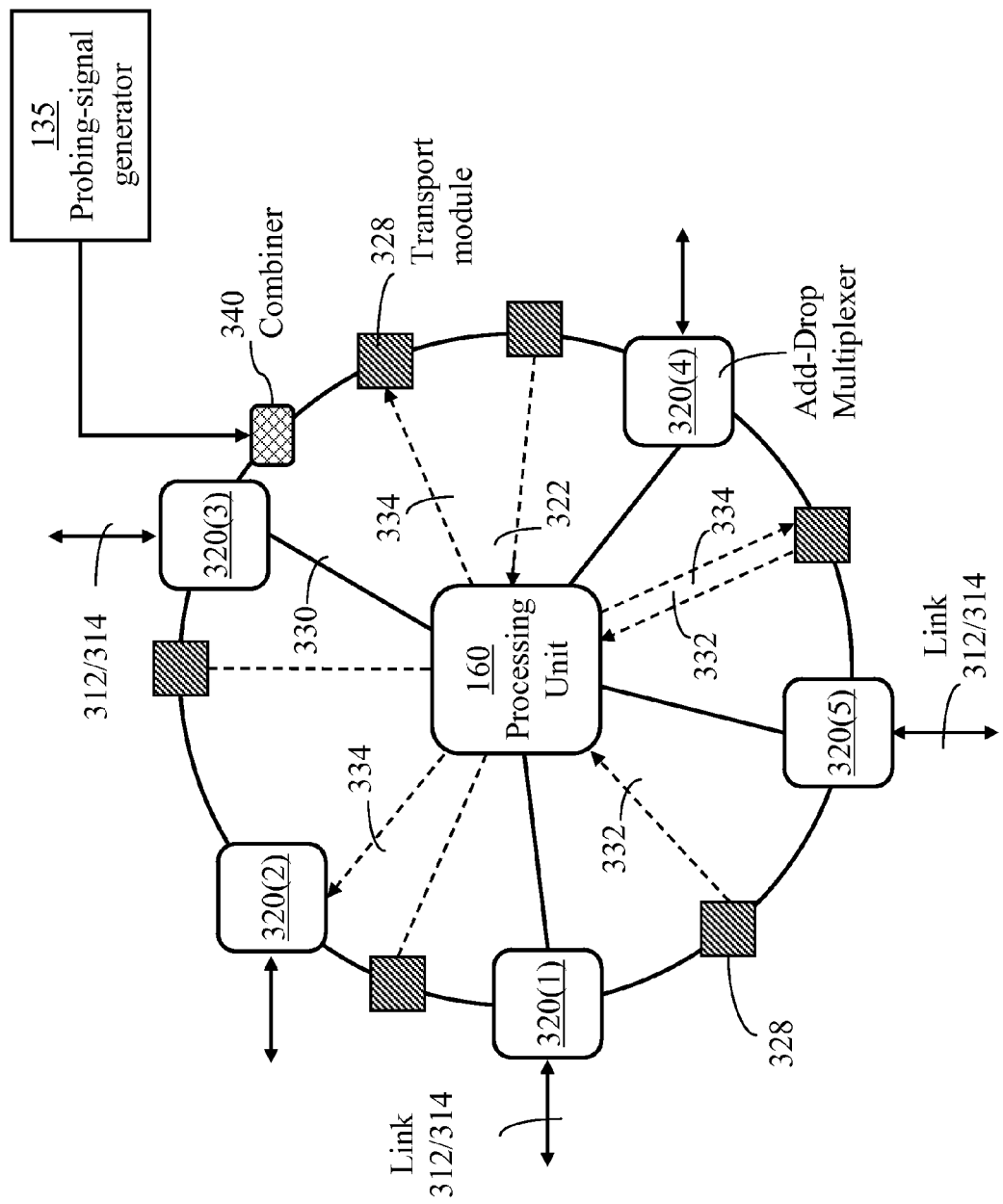
FIG. 3 illustrates a ring network comprising optical add-drop multiplexers and transport modules communicatively coupled to a processing unit, the network further including generators of probing signals and detectors of probing signals in accordance with an embodiment of the present invention.

FIG. 3 illustrates a ring network comprising optical add-drop multiplexers 320 and transport modules 328. An add-drop multiplexer 320 has a link 312 from data sources or from an external network node, and a link 314 to data sinks or to an external network node. Each of the two links 312 and 314 comprises at least one wavelength channel. At least one add-drop multiplexer 320 is associated with a probing optical signal generator 135. A transport module 328 may include a probing-signal detector and/or a chromatic-dispersion compensator (not illustrated). The ring network of FIG. 3 further comprises at least one processing unit 160, each for receiving measurements of chromatic dispersion and determining appropriate compensation adjustments. FIG. 3 illustrates only one processing unit 160. An add-drop multiplexer 320 (3) associated with a probing-signal generator 135 has a control channel 330 from a processing unit 160 to receive descriptors of a probing optical signal. Control channel 330 is preferably a dual channel. Each transport module 128 having a probing-signal detector has a control channel 332 to a processing unit 160 to report chromatic-dispersion measurements. Each transport module 128 having a chromatic-dispersion compensator has a control channel 334 from a processing unit 160 for receiving compensation adjustments. A combiner 340 combines the output of probing-signal generator 135 with operational optical signals from add-drop multiplexer 320(3). Alternatively, the function of the probing-signal generator 135 may be embedded within an optical transmitter of add-drop multiplexer 320(3).

Figure 4:
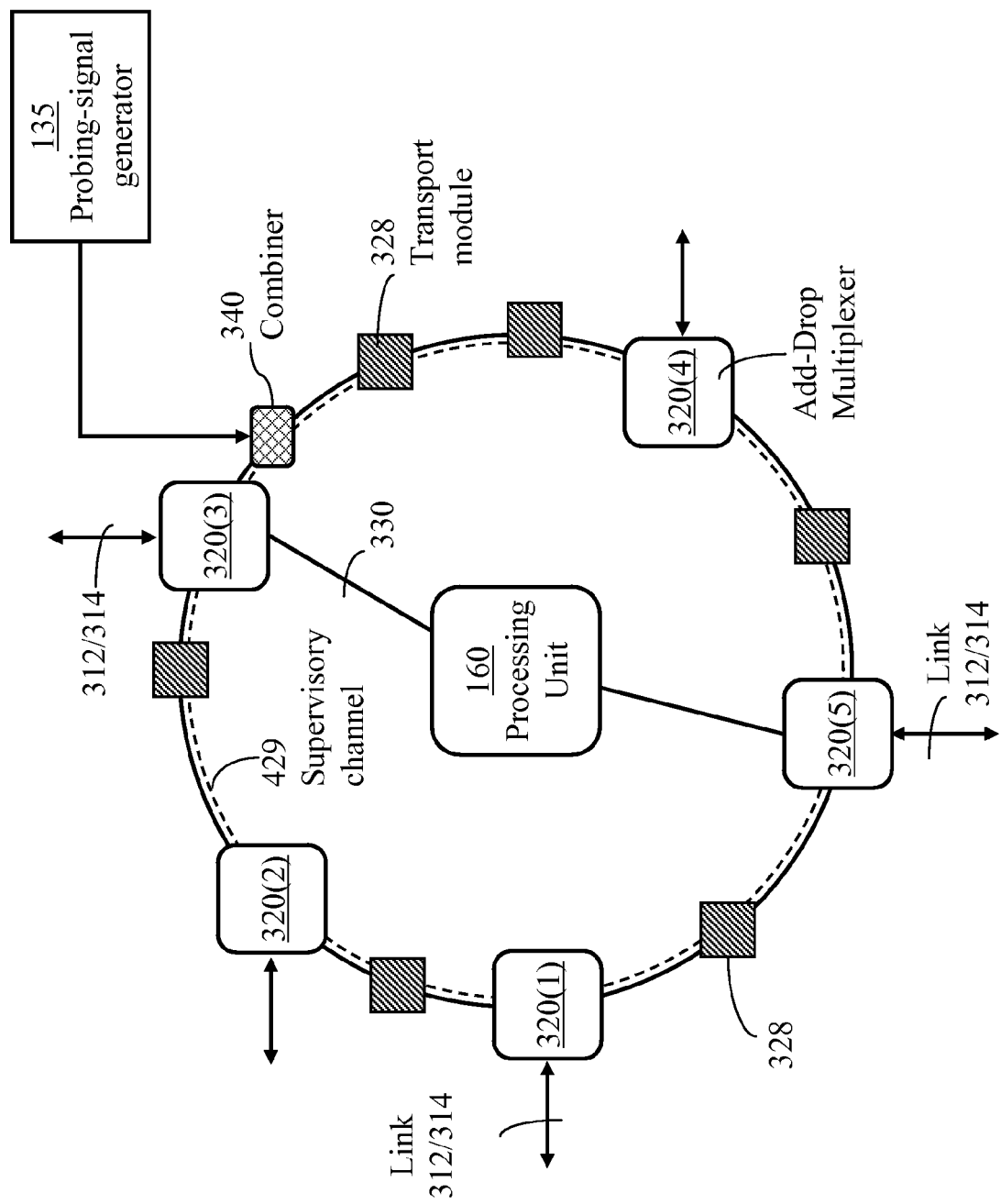
FIG. 4 illustrates a ring network similar to the network of FIG. 3 further comprising an optical supervisory channel traversing the add-drop multiplexers and the transport modules, in accordance with an embodiment of the present invention.

FIG. 4 illustrates a ring network similar to the ring network of FIG. 3. The network of FIG. 4, however, employs an optical supervisory channel 429 for exchanging control signal among the add-drop multiplexers and the transport modules 328. The optical-supervisory channel may terminate in a processing unit 160 for communicating probing-signal descriptors and chromatic-dispersion measurements to the processing unit and returning compensation adjustments to each transport module 328 having a chromatic-dispersion compensator. Alternatively, the processing unit may exchange control data with one of the add-drop multiplexer through a dual control channel 330.

Figure 5:
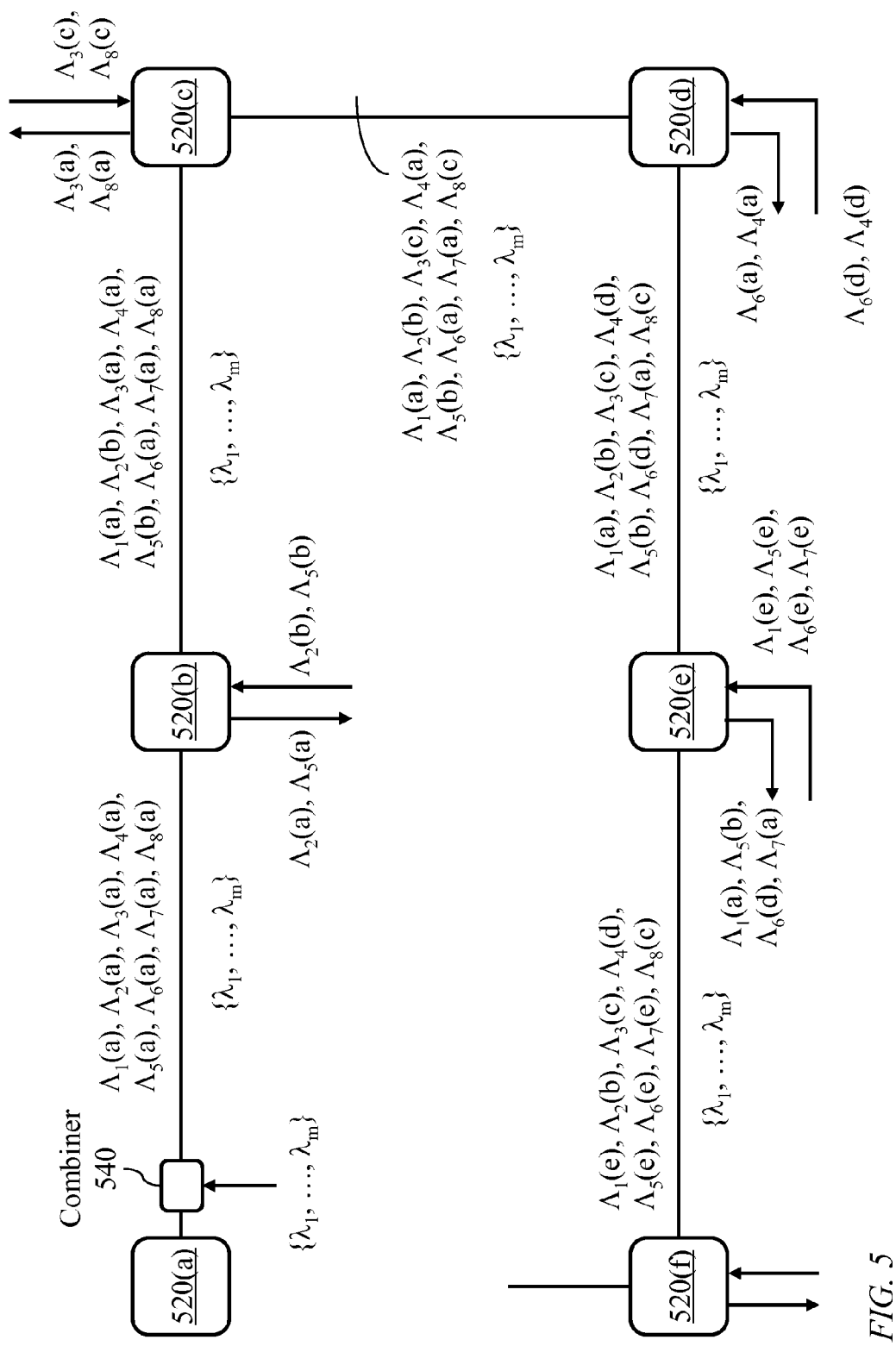
FIG. 5 illustrates a path in the network of FIG. 1 or the network of FIG. 3 carrying operating optical signals and a probing optical signal in accordance with an embodiment of the present invention.

FIG. 5 illustrates a path traversing six nodes 520 in a mesh network, of the type of network 100 of FIG. 1 or a ring network, of the type of the network of FIG. 3. The path traverses six nodes 520, individually identified as 520(*a*), 520(*b*), 520(*c*), 520(*d*), 520(*e*), and 320(*f*). A node 520 may be an optical switching node 120 or an add-drop multiplexer 320. Transport modules between successive nodes 520 are not illustrated but are understood to be present. Node 520(*a*) transmits eight operational optical signals occupying wavelength channels $\Lambda_1(a)$, $\Lambda_2(a)$, $\Lambda_3(a)$, $\Lambda_4(a)$, $\Lambda_5(a)$, $\Lambda_6(a)$, $\Lambda_7(a)$, and $\Lambda 8(a)$. A combiner 540 combines the eight operating signals with an optical probing signal which is wavelength modulated to have wavelengths $\{\lambda_1, \ldots, \lambda_m\}$, m>1, during successive time intervals as will be described with reference to FIG. 12. At node 520(*b*), optical signals of wavelength channels $\{\Lambda_2(a), \Lambda_5(a)\}$ are dropped (delamplitude-livered to data sinks or to external nodes) and wavelength channels $\{\Lambda_2(b), \Lambda_5(b)\}$ are added to the path. At node 520 (*c*), optical signals of wavelength channels $\{\Lambda_3(a), \Lambda_8(a)\}$ are dropped and wavelength channels $\{\Lambda_3(c), \Lambda_8(c)\}$ are added to the path. At node 520(*d*), optical signals of wavelength channels $\{\Lambda_4(a), \Lambda_6(a)\}$ are dropped and wavelength channels $\{\Lambda_4(d), \Lambda_6(d)\}$ are added to the path. At node 520(*e*), optical signals of wavelength channels $\{\Lambda_1(a), \Lambda_5(b), \Lambda_6(d), \Lambda_7(a)\}$ are dropped and wavelength channels $\{\Lambda_1(e), \Lambda_5(e), \Lambda_6(e), \Lambda_7(e)\}$ are added to the path. While the operating optical signals may differ in different links of the path under test, the same probing signal of wavelengths $\{\lambda_1, \ldots, \lambda_m\}$ traverses the entire path.

Figure 6:
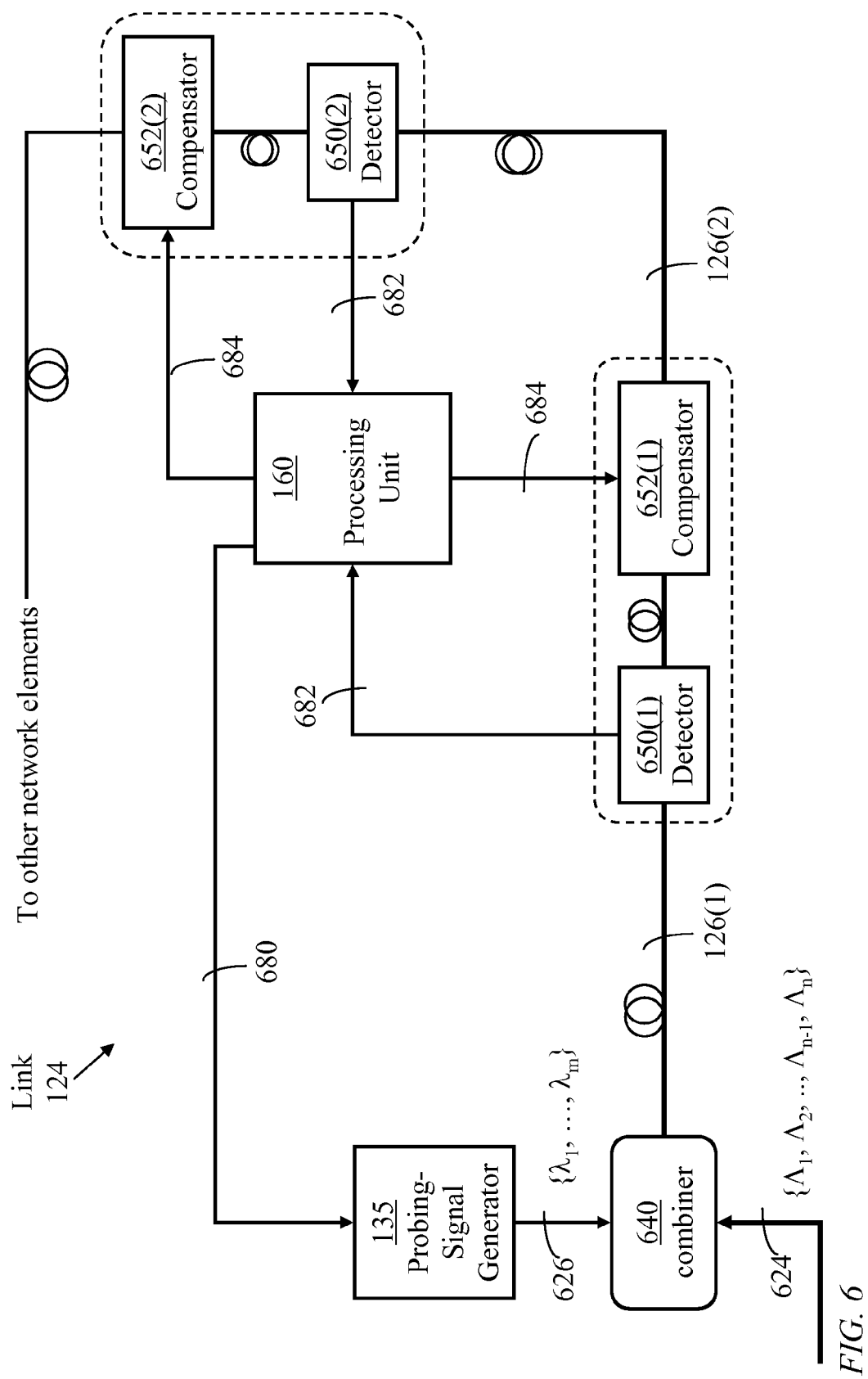
FIG. 6 illustrates a system for measuring chromatic dispersion at multiple points along a link, the system comprising a probing-signal generator, probing-signal detectors, adjustable chromatic-dispersion compensators, and a processing unit, in accordance with an embodiment of the present invention.

FIG. 6 illustrates a system for measuring chromatic dispersion over a link 124 having multiple spans. A probing-signal detector 650 and a chromatic-dispersion compensator 652 may be collocated or placed in proximity of each other. Only two spans 126(1) and 126(2) are illustrated. A probing-signal generator 135 produces a wavelength modulated optical signal which experiences wavelength dependent delay as it propagates along the link due to chromatic dispersion. To facilitate detecting the varying delay, the wavelength modulated optical signal is also amplitude modulated by a periodic probing tone to form a probing optical signal, which is preferably of sinusoidal waveform, of a relatively low frequency (such as 1 mega-hertz). The wavelength dependent delay is exhibited as a phase shift between portions of the envelope of the optical probing signal corresponding to different wavelengths. To facilitate the detection process, the wavelength is modulated according to square-wave functions of relatively large durations; for example varying from a few milliseconds to more than one second. Descriptors of probing optical signals are communicated from processing unit 160 to probing-signal generator 135 through a control channel 680. Advantageously, a probing-signal generator may be associated with, or integrated with, transmitting equipment of operating optical signals carrying payload data.

A probing optical signal may be added in a link under test by means of an optical combiner, which combines the probing optical signal with the operational optical signals. Alternatively, the probing optical-signal generator 135 may be integrated with transmitters of a switching node 120.

Figure 11:
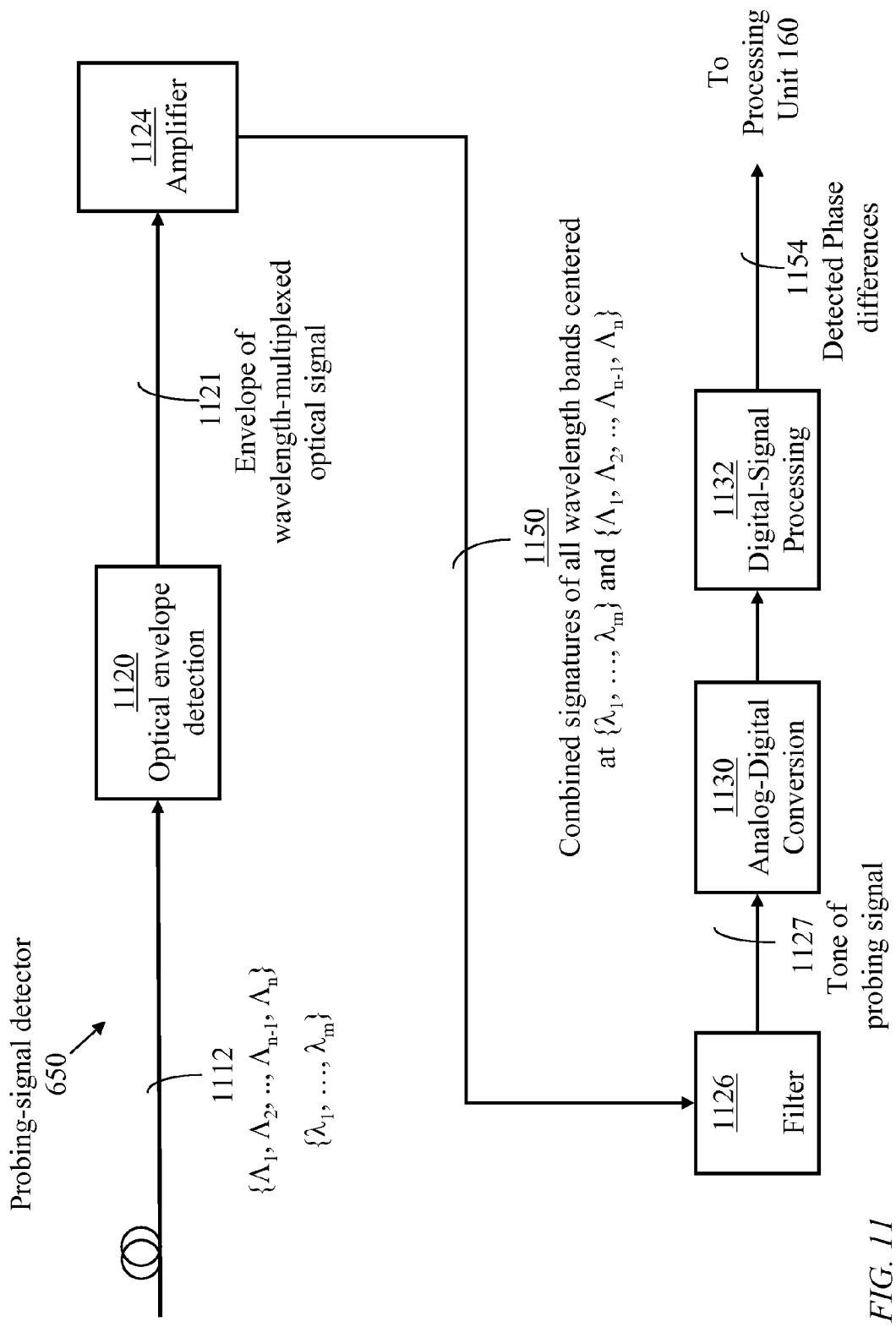
FIG. 11 illustrates a probing-signal detector in accordance with an embodiment of the present invention.

The link under test may be an operating link already carrying operating wavelengths $\{\Lambda_1, \ldots, \Lambda_n\}$, n≧1, modulated by payloads of arbitrary bit rates, such as 10 gigabits per second. The probing signal is therefore limited to have wavelengths $\lambda_1, \ldots, \lambda_m$, that are sufficiently separated from the operating wavelengths. The probing optical signal on channel 626 from the probing-signal generator 135, having testing wavelengths $\lambda_1, \ldots, \lambda_m$, m>1, is combined with the payload optical signal carried on a fiber link 624, having operating wavelengths $\Lambda_1, \Lambda_2, \ldots, \Lambda_{n-1}, \Lambda_n$, in a combiner 640. A probing-signal detector 650, to be described in FIG. 11, is placed at a transport module at the end of a first span 126. The probing-signal detector determines phase changes between successive segments of the probing signal and reports the measurement to processing unit 160 through a control channel 682. A compensator 652 may be located at a selected point along the link, and is preferably collocated with the probing-signal detector 650. A second probing-signal detector 650 is placed at the end of a second span 126 to measure the cumulative phase shift along the first span 126 and the second span 126 and reports the measurement(s) to the processing unit 160. Other detectors, if any, along the link similarly report phase-shift measurements to the processing unit 160. Several chromatic-dispersion compensators may be placed along the link. The processing unit 160 determines compensation adjustments for each compensator 652 based on the measurements collected from the probing-signal detectors 650, and the characteristics of the probing signal. The compensation adjustments are communicated from the processing unit 160 to the compensators 652 through control channels 684.

The processing unit 160 may be collocated with one of the nodes 120 in network 100 and may communicate with the detectors 650 and the compensators 652 through optical-supervisory channels.

Figure 7:
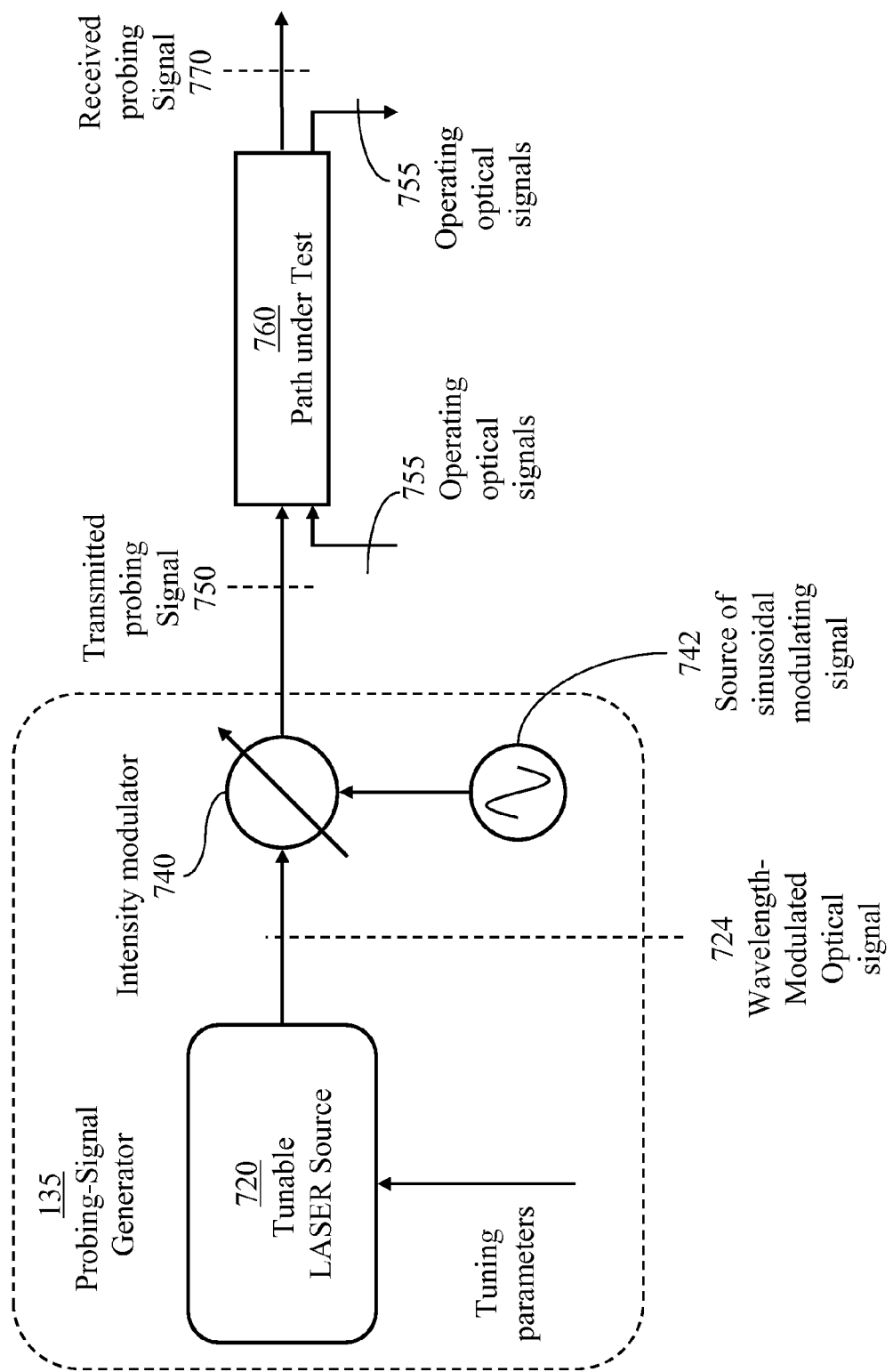
FIG. 7 illustrates a probing-signal generator using a wavelength modulated laser source, in accordance with an embodiment of the present invention.
Figure 9:
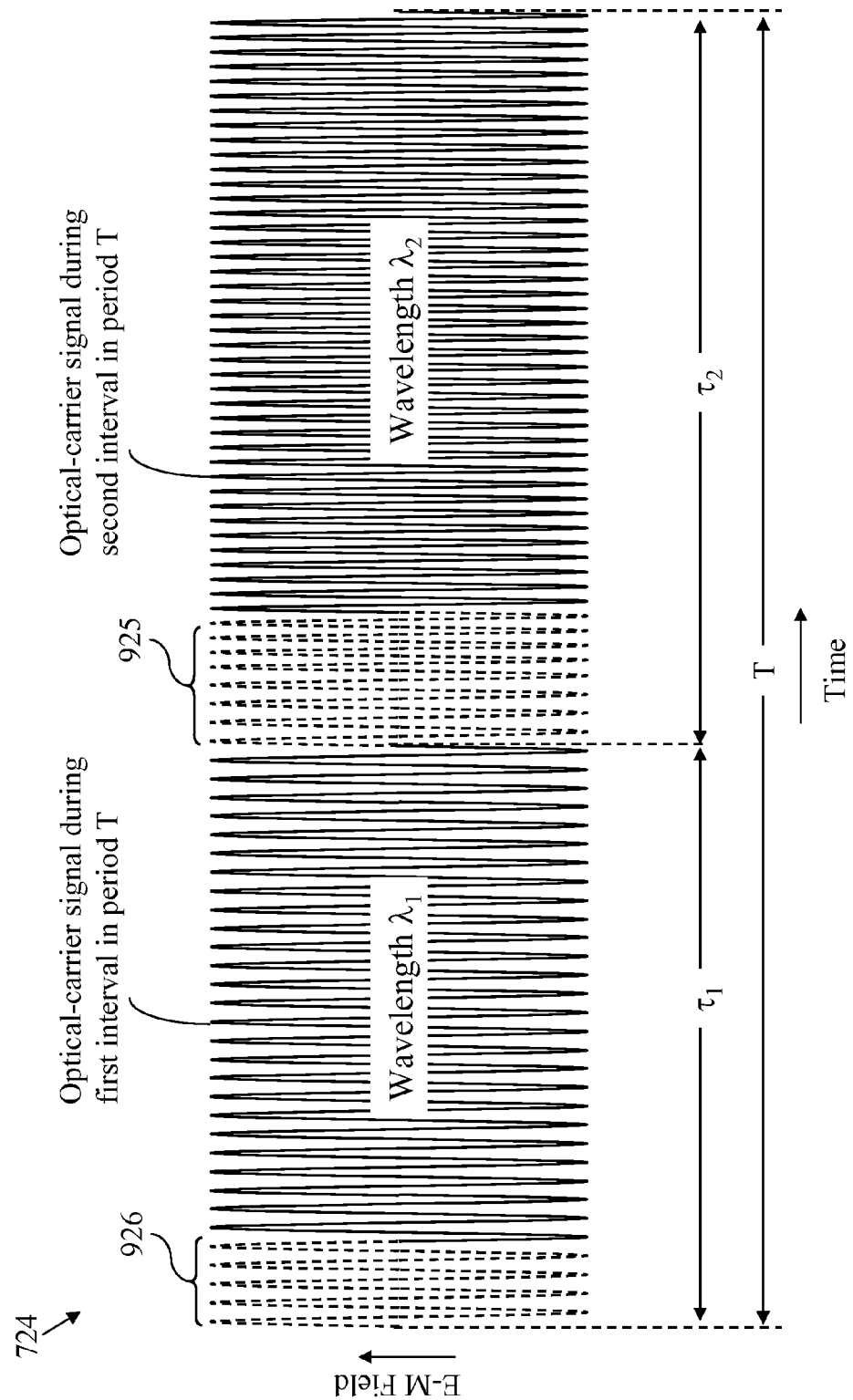
FIG. 9 illustrates one cycle of a periodic probing optical signal generated by the probing-signal generator of FIG. 7 or FIG. 8, where during each cycle the probing optical signal assumes one of two wavelengths, for use in an embodiment of the present invention.

FIG. 7 illustrates a probing-signal generator 135 comprising a tunable laser 720 which produces a wavelength modulated carrier signal 724 according to tuning parameters defining the objective wavelengths $\{\lambda_1, \ldots, \lambda_m\}$ and their durations $\{\tau_1, \ldots, \tau_m\}$. An exemplary output 724 of the tunable laser 720, for a case a signal alternating between two test wavelength $\lambda_1$ and $\lambda_2$ is illustrated in FIG. 9. The wavelength modulated optical signal is amplitude modulated in intensity modulator 740 by a periodic waveform from a source 742 to produce a probing signal 750 illustrated in FIG. 10. The periodic signal is preferably of a sinusoidal waveform. The probing signal 750 is transmitted, together with other operating optical signals 755, over a path 760 under test. A modified probing signal 770, altered by chromatic dispersion along the path or a part of the path, is processed at a probing-signal detector. The path 760 under test simultaneously carries operating optical signals 755 which are not affected by the probing signal 750.

Figure 8:
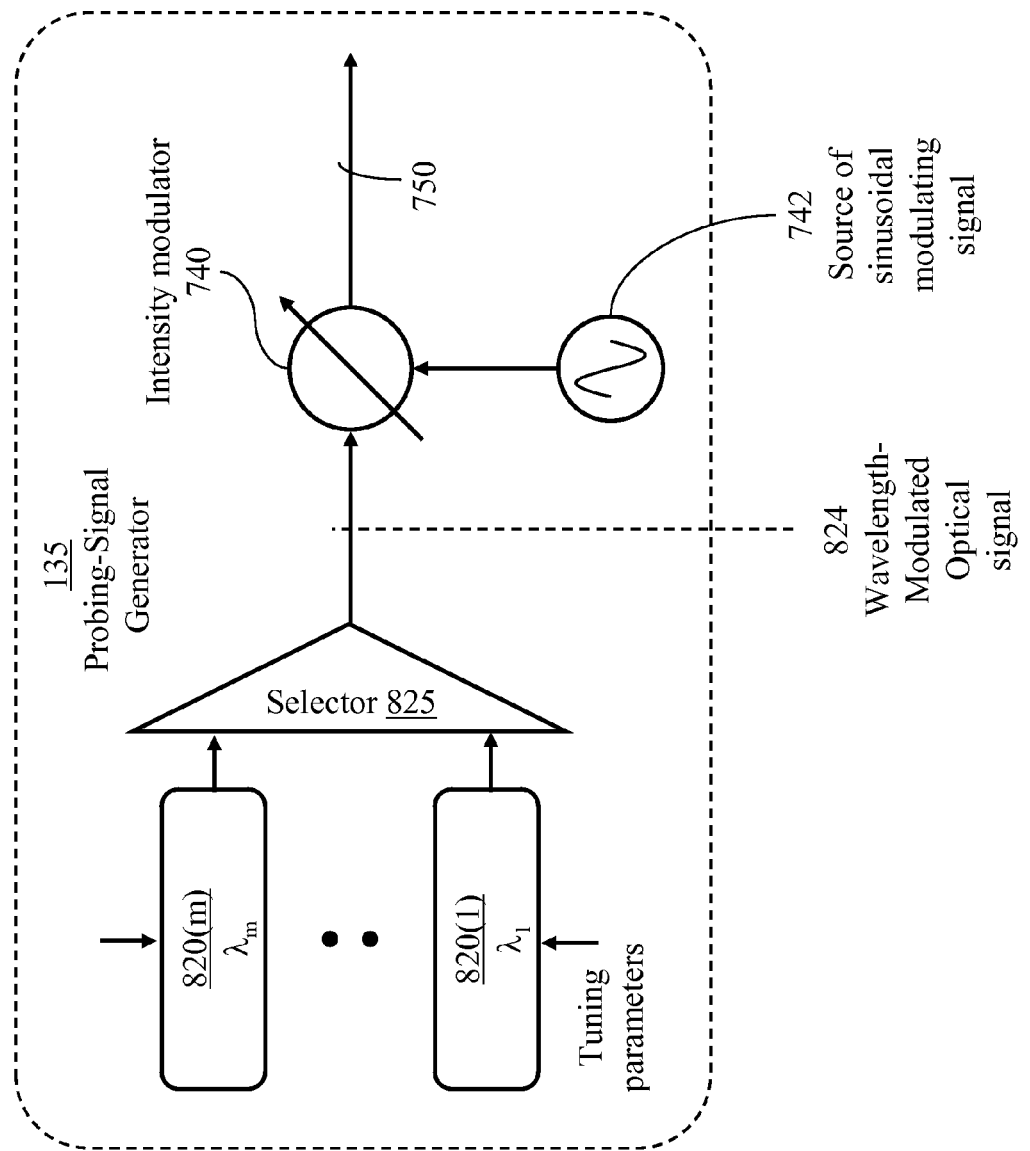
FIG. 8 illustrates a probing-signal generator using multiple laser sources, including at least one tunable laser source, in accordance with an embodiment of the present invention.

FIG. 8 illustrates an alternative probing-signal generator 135 comprising a number m of laser sources $\{820(1), \ldots, 820(m)\}$, where at least one of the laser sources 820 is tunable. Rather than modulating the wavelength of the single tunable laser 720 of FIG. 7, the wavelength modulated optical signal 824 is obtained using a temporal selector 825 which selects an output of one of the laser sources $\{820(1), \ldots, 820(m)\}$ during each of successive intervals of time. The signal 824 is amplitude modulated in intensity modulator 740 by a periodic waveform from a source 742 to produce a probing signal 750.

The switchover from one wavelength to another in tunable laser 720 of probing-signal generator 135 of FIG. 7 takes place after a transient period. The probing-signal generator 135 of FIG. 8 uses a temporal selector 825 to select an output of one of laser sources 820 operating in their steady states. However, due to the latency of the temporal selector 825, the switchover from one wavelength to another also takes place after a transient period.

FIG. 9 illustrates wavelength modulated signal 724 of FIG. 7, or wavelength modulated signal 824 of FIG. 8, for the case of a probing signal alternating between two wavelength $\lambda_1$ and $\lambda_2$ (m=2). The ordinate in FIG. 9 represents the instantaneous value of the electro-magnetic field (E-M field) in arbitrary units and the abscissa represents time. The period of the optical carrier is exaggerated to illustrate the wavelength change. The switchover from wavelength $\lambda_1$ to $\lambda_2$ in tunable laser 720 of probing-signal generator 135 of FIG. 7 takes place after a transient period 925, and the switchover from wavelength $\lambda_2$ to $\lambda_1$ takes place after a transient period 926. The switchover from $\lambda_1$ to $\lambda_2$, and vice versa, in the probing-signal generator of FIG. 8 also takes place after a transient period.

Figure 10:
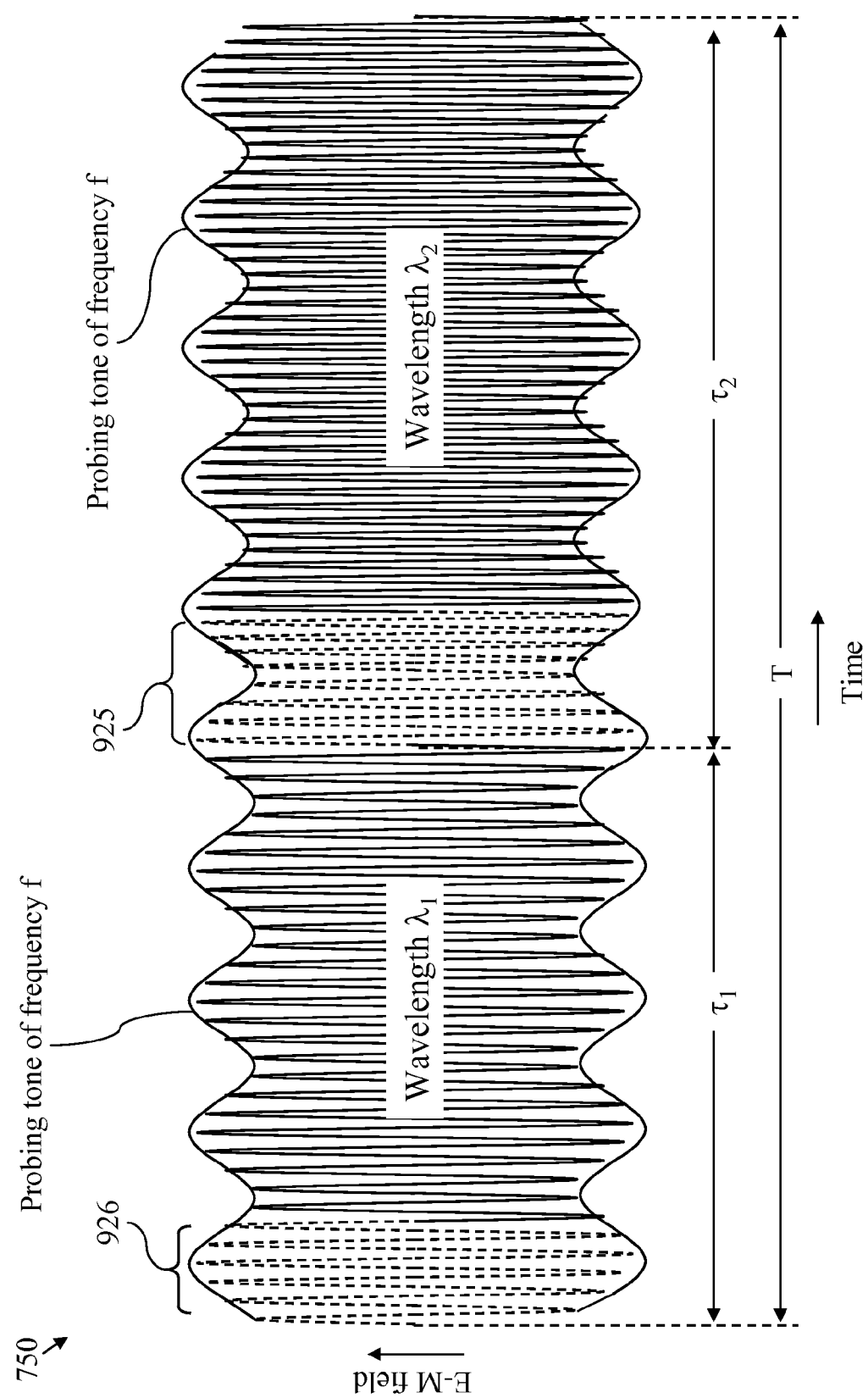
FIG. 10 illustrates the probing optical signal of FIG. 9 further amplitude modulated by a sinusoidal tone for use in an embodiment of the present invention.

FIG. 10 illustrates intensity-modulated signal 750 of FIG. 7 (or FIG. 8) where the probing tone is of sinusoidal form with a frequency f cycles/second. In general, the probing tone may be selected to be a periodic signal of arbitrary waveform, such as a square waveform or a saw-tooth waveform. However, using a pure sinusoidal waveform significantly simplifies the chromatic-dispersion measurement process. The probing tone values during the transient periods 925 and 926 need not be used in the process of phase measurement.

FIG. 11 illustrates a probing-signal detector 650 receiving an optical signal through an optical fiber link 1112 carrying operating optical signals of wavelengths $\Lambda_1, \Lambda_2, \ldots, \Lambda_{n-1}, \Lambda_n$, and a probing optical signal with time-interleaved wavelengths $\lambda_1, \ldots, \lambda_m$. An operating optical signal may be modulated by an information signal, for example of a bit rate of 10 gigabits per second, as well as a signature (a dither tone) of a relatively low frequency content used for operational control such as identifying the operating signal along its route to destination, power-level measurements. Thus, the low-frequency envelope of the optical signal received from optical fiber link 1112 may contain signatures of the n operating optical signals as well as the probing tone modulating the probing optical signal. The frequency of the probing tone is selected to be distinct from any of the frequencies within the combined spectrum of the signatures of the operating optical signals to facilitate isolating the probing signal.

Detector 650 comprises an optical envelope detection circuit 1120, which may be based on a photodiode, for generating a signal 1121 representing the envelope of the optical signal received from link 1112. Signal 1121 is an electrical signal representative of optical signal 1121. Signal 1121, amplified in electronic amplifier 1124, is presented to an electronic filter 1126 through a local channel 1150. The output signal 1127 of filter 1126 contains the probing tone. At this point, a probing tone, which is sinusoidal at source, is no longer of a pure-sinusoidal waveform due to the difference in propagation speeds of successive portions of the probing signal having different wavelengths. Detection of phase differences between the successive portions of the probing signal may be determined by analogue circuitry. Preferably, however, the phase difference may be determined by precise digital-signal-processing means, well known in the art. Thus, signal 1127 is encoded into a digital signal in analog-digital converter 1130, the output of which is processed in digital-signal-processing circuit 1132. The output 1154 of circuit 1132 is sent to a processing unit 160 either through a dedicated communication channel (not illustrated), a switched path through a shared data network (not illustrated), or a shared supervisory channel (not illustrated).

In a wavelength division multiplexing network, the individual channels may be modulated by digital or analog payload signals. To facilitate channel identification and network topology discovery, the channels may also be individually modulated by distinct low-frequency identifying signals, traditionally called "dither tones", or "channel signatures". Thus, the envelope of the combined optical signal at the output of the optical envelope detector 1120 contains, amongst payload components, the spectrum of the low-frequency identifying signals. Optical channel identification and topology discovery are described in the following patents, all of which are incorporated herein by reference:

U.S. Pat. No. 7,158,723 (Wan et al.), "Channel identification in communications networks";

U.S. Pat. No. 7,155,122 (Wan et al.), "Channel identification in communications networks";

U.S. Pat. No. 7,142,783 (Obeda et al.), "Method and system for identification of channels in an optical network";

U.S. Pat. No. 7,054,556 (Wan et al.), "Channel identification in communications networks";

U.S. Pat. No. 7,031,606 (Liu et al.), "Method and System for monitoring performance of optical networks"; and U.S. Pat. No. 6,968,131 (Obeda et al.), "Topology discovery in optical WDM networks".

Descriptors of a Probing Optical Signal

The exemplary probing optical signal 750 of FIG. 10 is characterized by the period T, the time intervals of durations $\tau_1$ and $\tau_2$, the wavelengths $\lambda_1$ and $\lambda_2$, and the frequency f of the probing tone. In general, the probing optical signal may have more than two wavelengths during m>1 successive time intervals, and the period T of the probing optical signal may be divided into m intervals of durations $\{\tau_1, \ldots, \tau_m\}$. The descriptors of the probing optical signal may then include: (a) the period T; (b) the number m of wavelengths; (c) the durations of the m intervals $\tau_1, \ldots, \tau_m$ (T=$\tau_1$+ . . . +$\tau_m$); (d) the wavelengths $\lambda_1, \ldots, \lambda_m$, corresponding to the m intervals; (e) the frequency f and the waveform of the probing tone.

The probing-optical-signal descriptors are determined by a processing unit, based on information on the network layout, the wavelength of the operational optical signals, the routes of lightpaths, etc.

Figure 12:
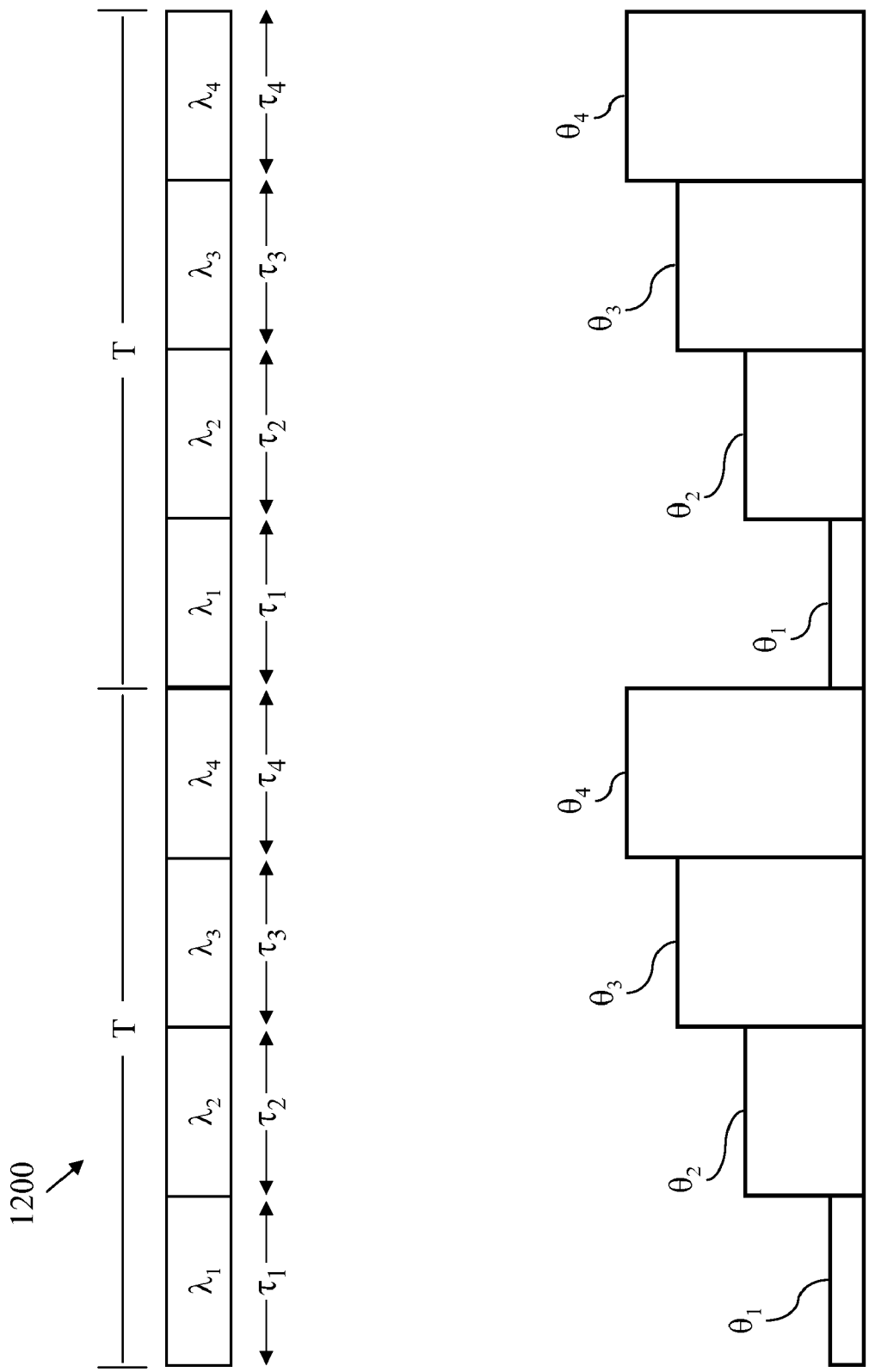
FIG. 12 illustrates a first probing signal, having a repetitive pattern of different wavelengths during successive time intervals, and corresponding phase differences at wavelength change instants, the phase differences resulting from cumulative chromatic dispersion over a path from a source to a detection point, in accordance with an embodiment of the present invention.

FIG. 12 illustrates a first wavelength modulated probing optical signal 1200, selected to be periodic with a period T. During each period T, the wavelength of the probing signal is modified according to step functions to have one of four values $\lambda_1, \lambda_2, \lambda_3$, and, $\lambda_4$ during time intervals $\tau_1, \tau_2, \tau_3$, and $\tau_4$. At source, the wavelength modulated probing signal is amplitude modulated with a continuous sinusoidal signal. The amplitude modulation process is not affected by the abrupt change in wavelength, i.e., phase continuity at an instant of wavelength change is assured. Due to chromatic dispersion, the optical signal received at a monitoring point exhibits a differential delay of: $\Delta_{12}$ between time intervals $\tau_1$, $\tau_2$, $\Delta_{12}$ between time intervals $\tau_1$ and $\tau_2$; $\Delta_{23}$ between time intervals $\tau_2$ and $\tau_3$; $\Delta_{34}$ between time intervals $\tau_3$ and $\tau_2$; and $\Delta_{41}$ between time intervals $\tau_4$ and $\tau_1$. With a sinusoidal probing tone of frequency of f hertz, the corresponding phase differences of the probing tone are: $\Phi_{12}=\omega\Delta_{12}$; $\Phi_{23}=\omega\Delta_{23}$; $\Phi_{34}=\omega\Delta_{34}$; and $\Phi_{41}=\omega\Delta_{41}$, where $\omega$ is the angular frequency of the probing signal, $\omega=2\pi f$. The phase of the probing tone during the four intervals is measured as $\theta_j$, j=1, 2, 3, and 4, where the phase $\theta_1$ of the probing tone during the first time interval $\tau_1$ is relative to some reference and its value is not of interest. The phase differences $\Phi_{12}, \Phi_{23}, \Phi_{34}, \Phi_{41}$ are determined as $\Phi_{12}=\theta_2-\theta_1, \Phi_{23}=\theta_3-\theta_2, \Phi_{34}=\theta_4-\theta_3$, and $\Phi_{41}=\theta_1-\theta_4$.

Figure 13:
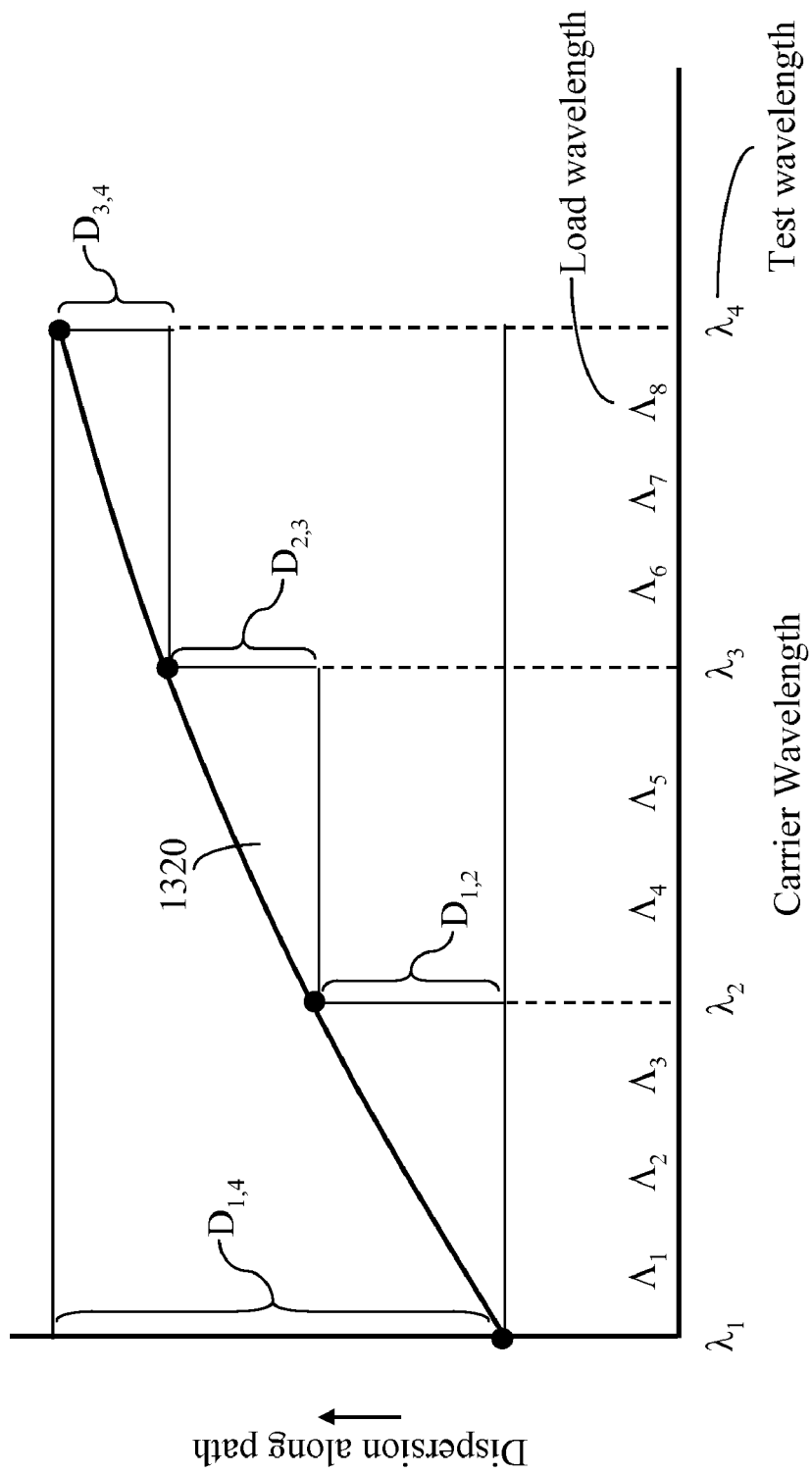
FIG. 13 illustrates chromatic-dispersion variation as a function of wavelength, determined from phase differences detected using the first probing signal, in accordance with an embodiment of the present invention.

FIG. 13 illustrates an exemplary dispersion-wavelength characteristic function 920 along an optical fiber path of arbitrary length.

The coefficient D of chromatic dispersion of an optical fiber span at a wavelength $\lambda$ is defined as the differential delay per unit wavelength between two optical signals of wavelengths $\lambda$ and ($\lambda+\epsilon$) propagating along a unit length of the optical fiber, i.e., D=$\text{Limit}_{\epsilon\to 0}(\delta_{\lambda+\epsilon}-\delta_\lambda)/\epsilon$ where $\delta_\lambda$ is the propagation delay per unit length at wavelength $\lambda$ and $\delta_{\lambda+\epsilon}$ is the propagation delay per unit length at wavelength $\lambda+\epsilon$. The differential delay $\Delta_{jk}$ is a measure the total chromatic dispersion along the path under test between the probing-signal segment of wavelength $\lambda_j$ and the probing-signal segment of wavelength $\lambda_k$. The dispersion-wavelength characteristic function 1320 may be constructed from several measurements of the differential delay $\Delta_{jk}$ along the optical fiber span for different values of $\lambda_j$ and/or $\lambda_k$. The chromatic dispersion at any wavelength of interest is determined as the corresponding slope of the characteristic function 1320. The chromatic-dispersion coefficient D along an optical fiber span, assumed to be homogeneous, is determined as the chromatic dispersion divided by the length of the span.

The differential delay $\Delta_{jk}$ is determined as $\Delta_{jk}=\Phi_{jk}/\omega$, $\Phi_{jk}$ being the measured phase difference between the probing tone segments corresponding to wavelength $\lambda_k$ and $\lambda_j$. In the exemplary probing optical signal of FIG. 12, $1\leq j\leq 4$ and $1\leq k\leq 4$.

Figure 14:
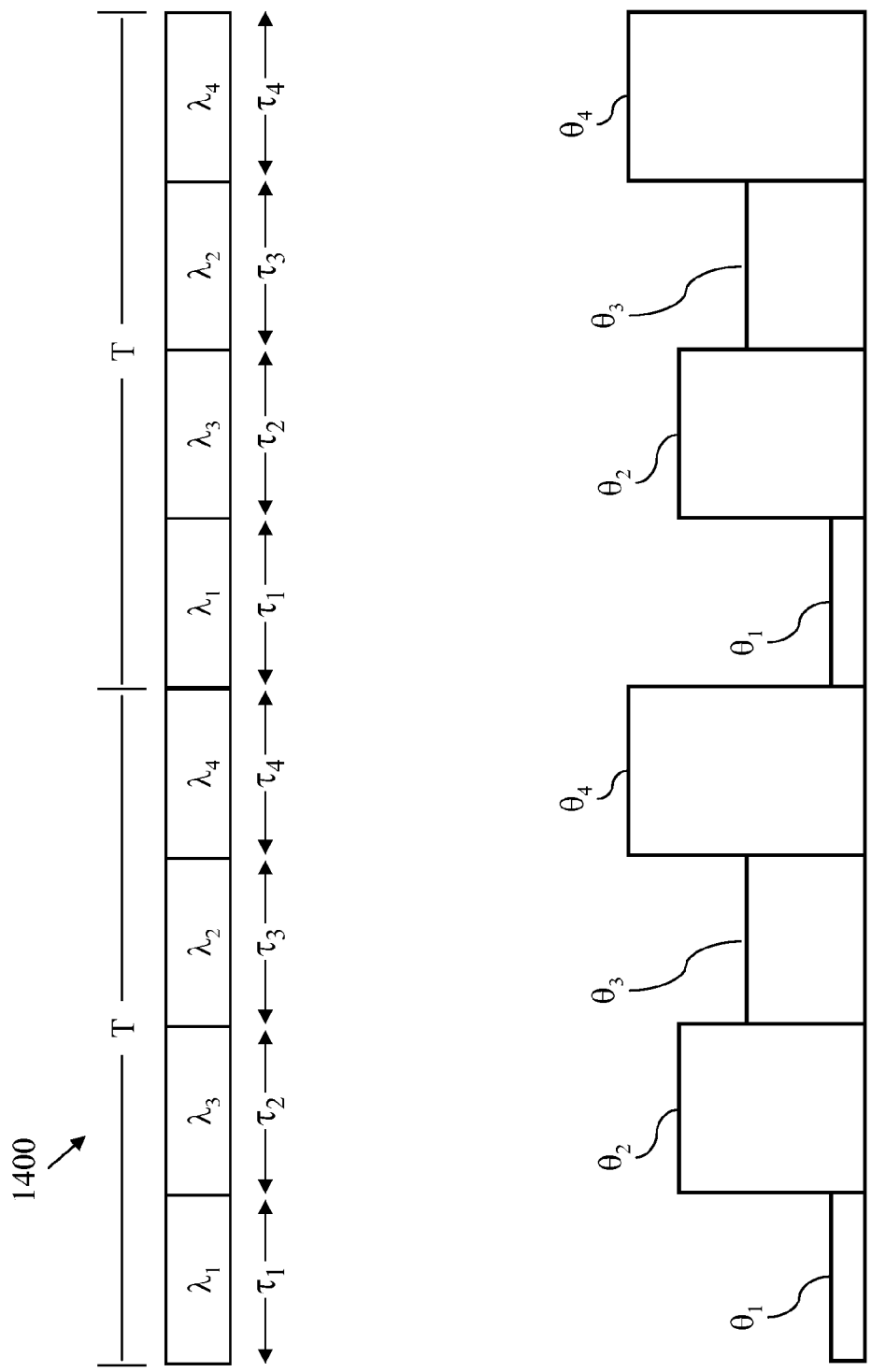
FIG. 14 illustrates a second probing signal and corresponding phase differences at a detection point.

FIG. 14 illustrates a second probing signal 1400 similar to probing signal 1200 of FIG. 12, the only difference being that the wavelength of the probing signal during second interval of each period T is $\lambda_3$ and the wavelength during the third interval is $\lambda_2$. The phases of the probing tone, with respect to an arbitrary phase reference, during the four intervals are indicated. The differential propagation delay between any two of the test wavelengths $\{\lambda_1, \ldots, \lambda_m\}$ is determined as described above with reference to FIG. 12.

Figure 15:
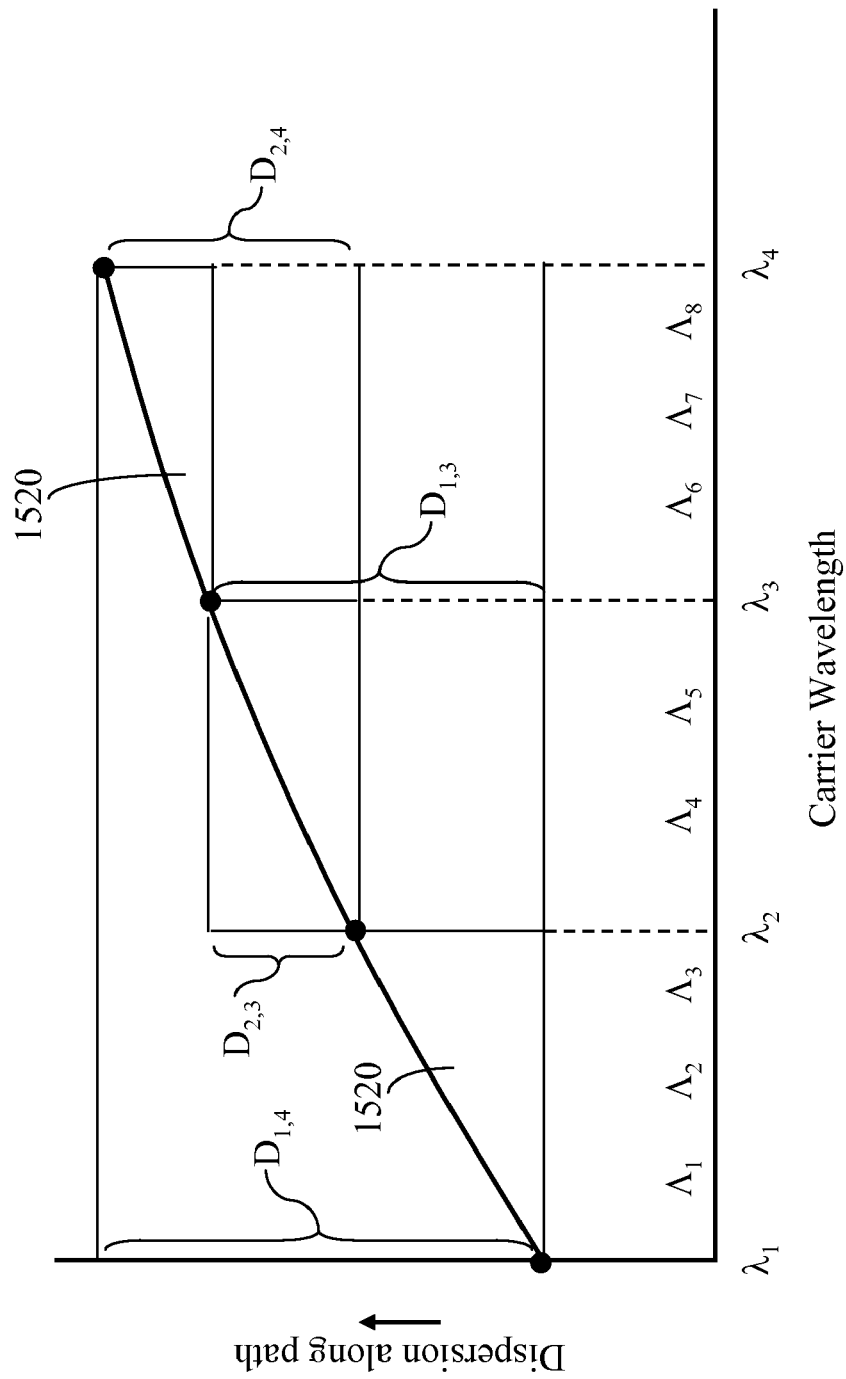
FIG. 15 illustrates chromatic-dispersion variation as a function of wavelength determined from phase differences detected using the second probing signal, in accordance with an embodiment of the present invention.

FIG. 15 illustrates chromatic-dispersion variation as a function of wavelength determined from phase differences detected from the second probing signal. The dispersion-wavelength characteristic function 1520, determined from phase measurements based on probing signal 1400, is theoretically identical to the dispersion-wavelength characteristic function 1320, any deviation would be due to random or systematic measurement errors.

Figure 16:
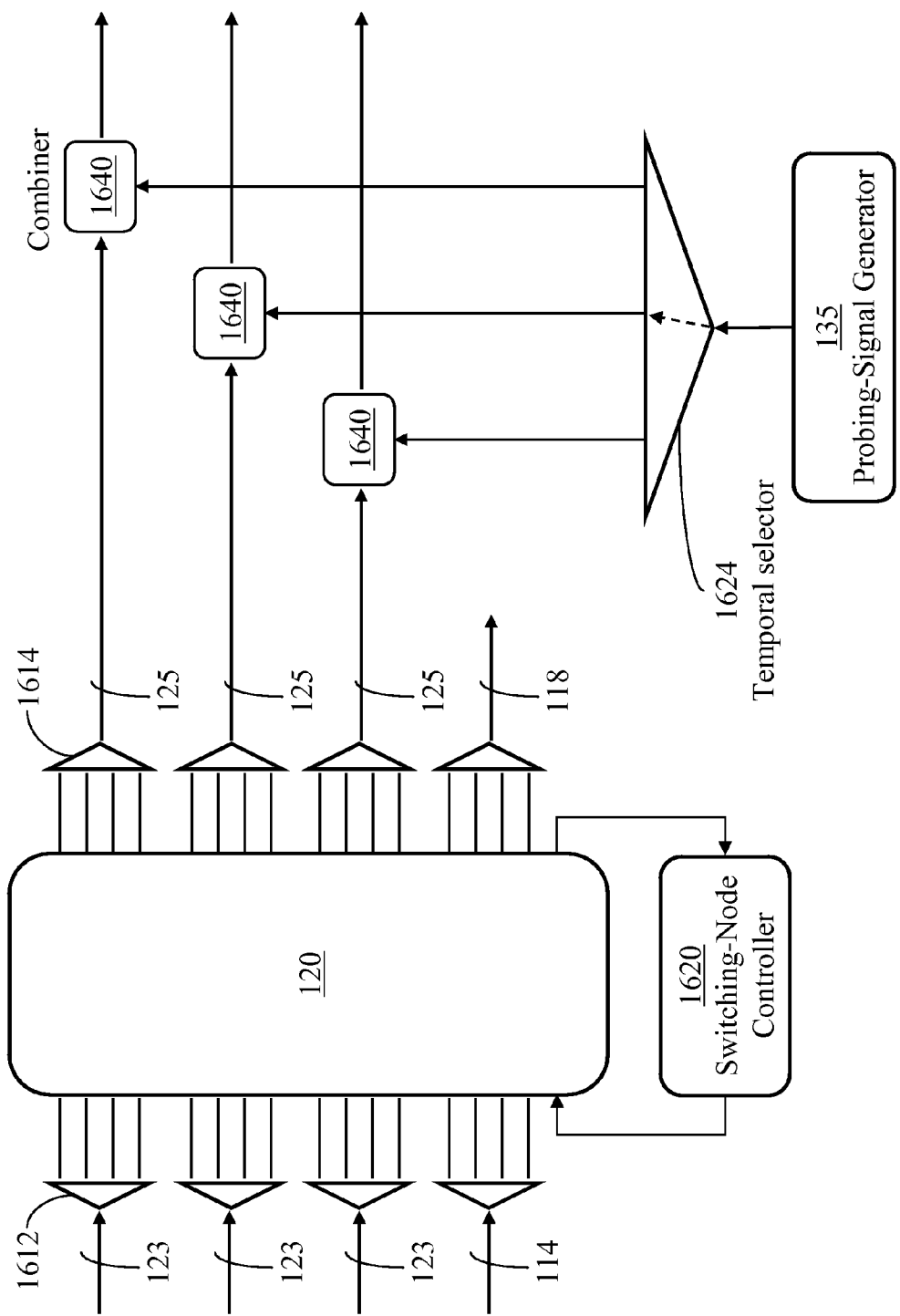
FIG. 16 illustrates a first arrangement of a shared probing-signal generator in the network of FIG. 1, in accordance with an embodiment of the present invention.

FIG. 16 illustrates a first arrangement of a shared probing-signal generator 135 in the network of FIG. 1. An exemplary optical switching node 120 has three input WDM links 123 (FIG. 1) each comprising a number of operating wavelength channels, three output WDM links 125 (FIG. 1) each comprising a number of operating wavelength channels, an input fiber link 114 comprising ingress wavelength channels 115 carrying data from data sources or from a node of an external network, and an output fiber link 118 having multiple wavelength channels 117 carrying data to data sinks or to a node in an external network. A combiner 1640 may be associated with each output link 125.

Optical switching node 120 has a controller 1620 for allocating an internal path from each input wavelength channel in a WDM link 123 to a respective output WDM link 125, and for selecting a route for each lightpath. A probing-signal generator 135 generates a probing signal of wavelength $\{\lambda_1, \ldots, \lambda_m\}$ and connects to a temporal selector 1624 which connects a number of combiners 1640. Selector 1624 presents the probing signal to a selected combiner 1640 receiving operating optical signals of central wavelengths $\{\Lambda_1, \ldots, \Lambda_n\}$, $n\geq 1$, from an output link 125. A switching node 120 may have numerous output links 125, each of which constituting a first span of a path to another switching node 120, in which case more than one probing-signal generator 135 may be deployed, each dedicated to a number of output WDM links 125. For example, a switching node 120 having 64 output WDM links 125 may be provided with four probing-signal generators 135 each serving 16 output WDM links 125, one at a time, through a 1:16 temporal selector similar to temporal selector 1624.

Figure 17:
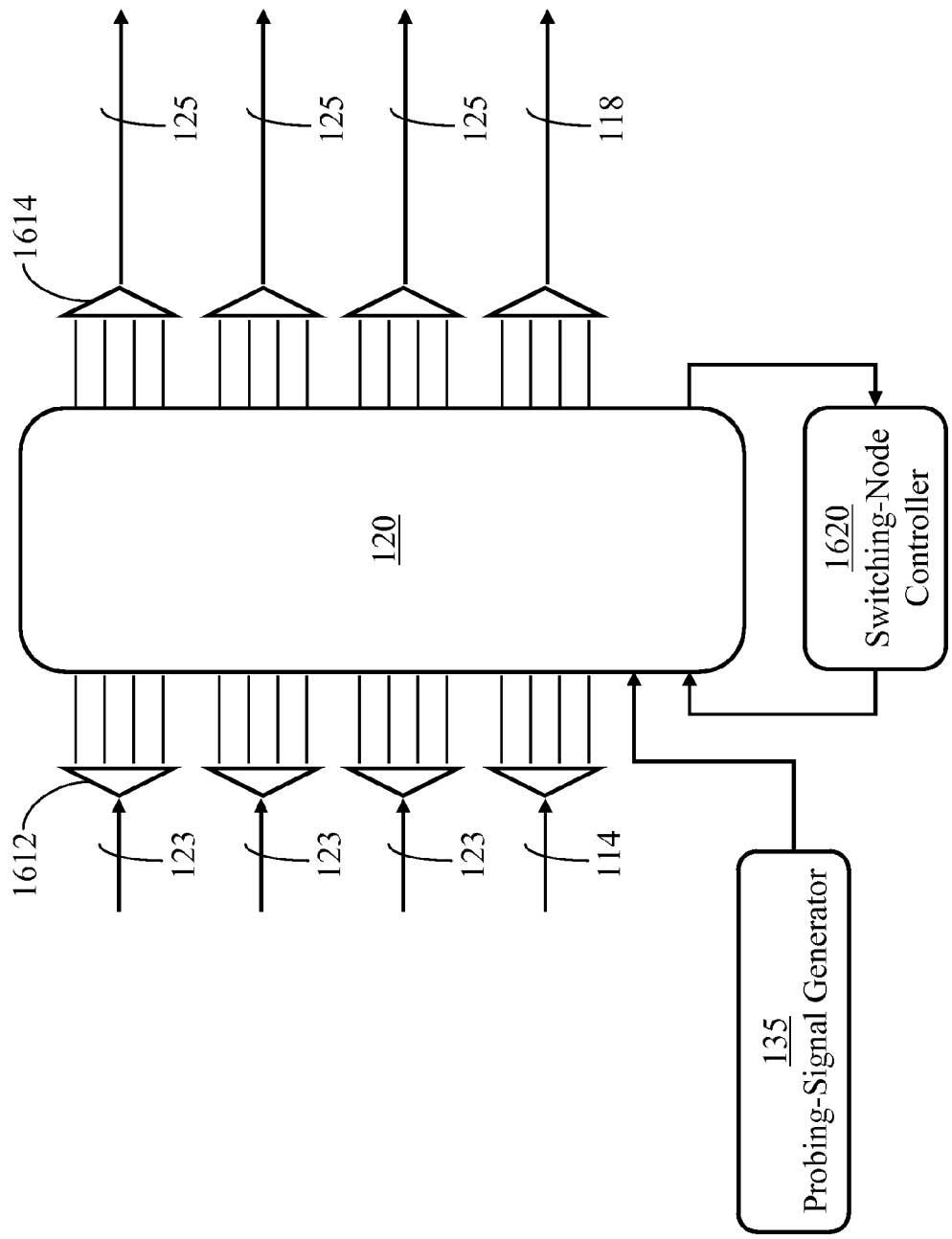
FIG. 17 illustrates a second arrangement of a shared probing-signal generator in the network of FIG. 1, in accordance with an embodiment of the present invention.

FIG. 17 illustrates a second arrangement of a shared probing-signal generator 135 in the network of FIG. 1. The probing-signal generator 135 connects to an input port of a switching node 120 and the probing signal is switched through the switching fabric to a selected output link 125.

Figure 18:
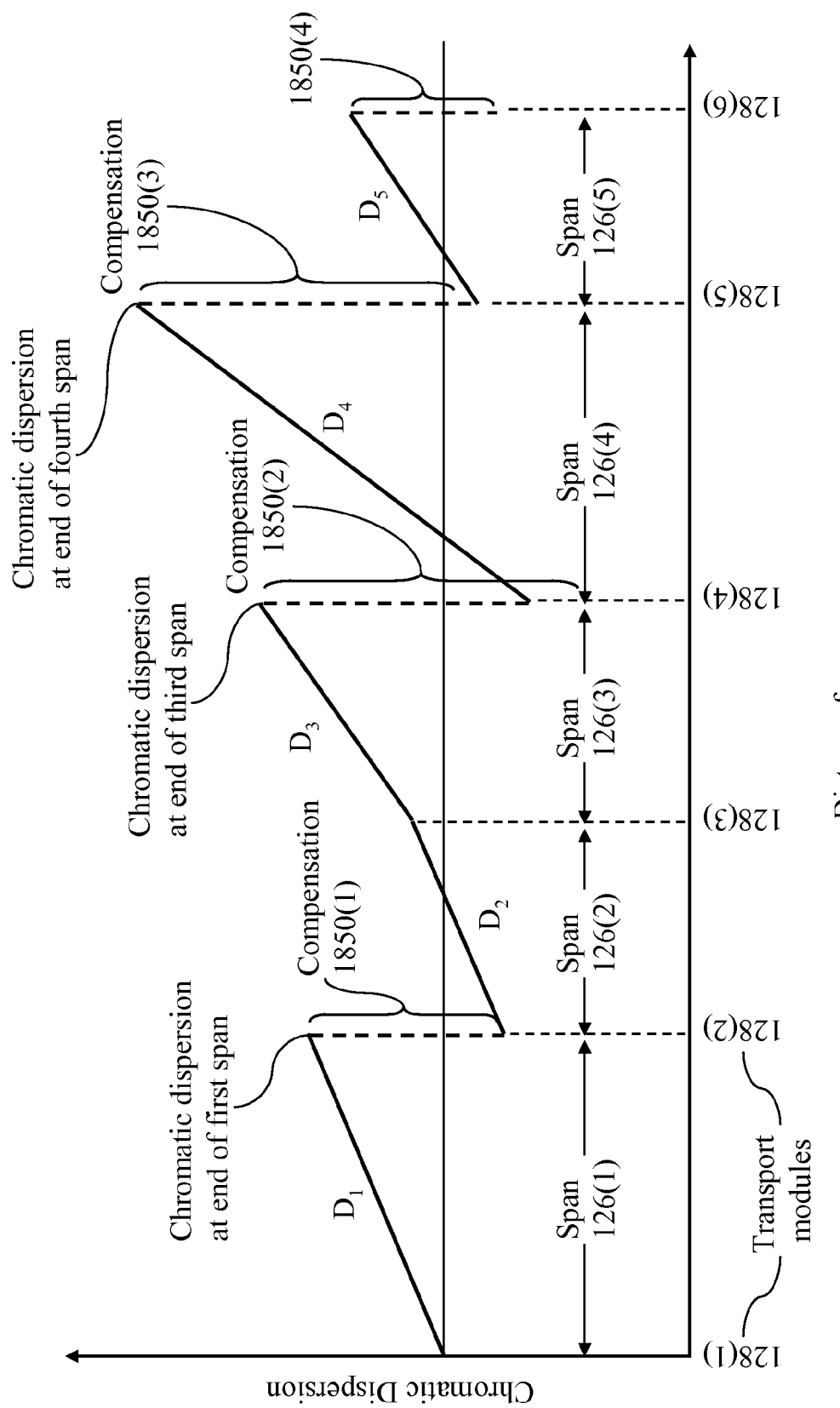
FIG. 18 illustrates dispersion measurement and compensation along a path in an exemplary optical network, in accordance with an embodiment of the present invention.

FIG. 18 illustrates dispersion measurement and compensation along a path traversing six transport modules 128, individually identified as 128(1), to 128(6), in an exemplary optical network. A transport module 128 may be embedded in a switching node 120 (FIG. 1) or an add-drop multiplexer 320 (FIG. 3). Fiber span 126(1), between transport modules 128

(1) and 128(2), has a chromatic-dispersion coefficient $D_1$ and introduces an amount of dispersion that is compensated, by a value 1850(1), at transport module 128(2) by a respective chromatic-dispersion compensator (not illustrated). Additional amount of dispersion is introduced in fiber span 126(2) between transport modules 128(2) and 128(3), which has a chromatic-dispersion coefficient $D_2$. The chromatic dispersion between transport modules 128(2) and 128(3) is not compensated; instead it further builds up in fiber span 126(3) between transport modules 128(3) and 128(4), has a chromatic-dispersion coefficient $D_3$. At transport module 128(4), the chromatic dispersion accumulated over fibers spans 126(2) and 126(3) is compensated by a value 1850(2). Fiber span 126(4), between transport modules 128(4) and 128(5), has a higher chromatic-dispersion coefficient $D_4$ and introduces an amount of dispersion that is compensated at transport module 128(5) by a value 1850(3). Fiber span 126(5), between transport modules 128(5) and 128(6), has a chromatic-dispersion coefficient $D_5$ and introduces an amount of dispersion that is compensated at transport module 128(6).

The processing unit 160 receives chromatic-dispersion measurements per span from respective transport modules 128 and uses the measurements to determine appropriate adjustments, if any, for chromatic-dispersion compensators placed at selected transport modules 128 in the network.

Measuring Phase Change

Figure 19:
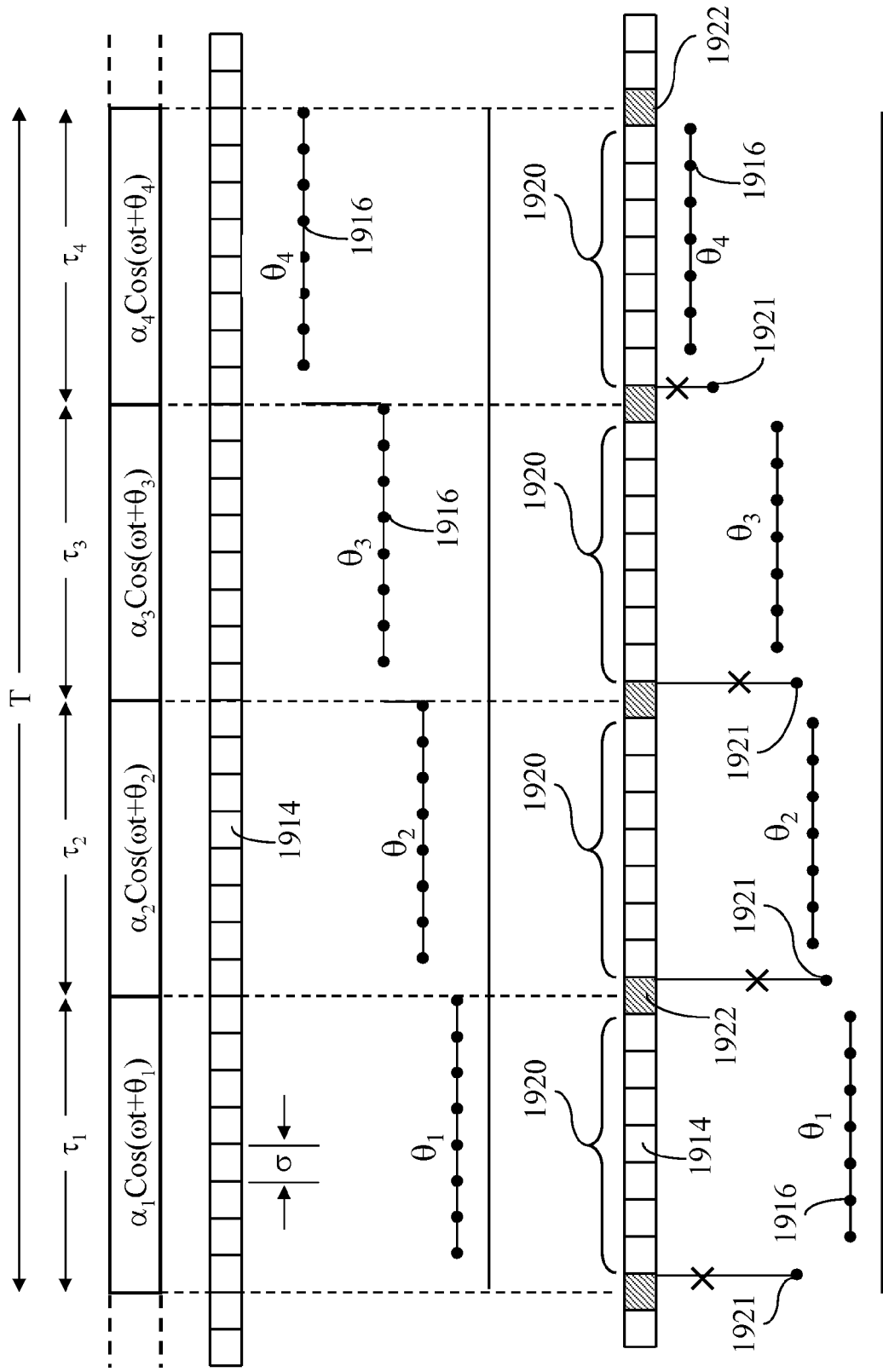
FIG. 19 illustrates a method of determining phase differences of a probing tone during successive time intervals in accordance with an embodiment of the present invention.

FIG. 19 illustrates a method of determining phase differences of a probing tone corresponding to different values of the wavelength of the optical probing signal. The period T of a periodic probing signal may comprise multiple intervals, where during each interval, the wavelength of the optical probing signal remains unchanged. In the exemplary probing signal of FIG. 12, the period T is divided into four time intervals of duration $\tau_1, \tau_2, \tau_3$, and $\tau_4$, corresponding to wavelengths $\lambda_1, \lambda_2, \lambda_3$, and $\lambda_4$, respectively. The envelope of an optical signal received at a probing-signal detector 650 may contain different signatures, associated with the operational optical signals, in addition to the probing tone. The probing-signal detector 650 detects the envelope of the optical signal, comprising any optical signatures of the operational optical signals and the probing tone, and produces a corresponding electrical signal. The probing-signal detector 650 may filter out all spectral components other than the frequency component(s) corresponding to the probing tone. Alternatively, the detector may determine the entire spectrum of the envelope, direct spectral components corresponding to the signatures to a wavelength tracking unit (not illustrated), and use the spectral component(s) corresponding to the probing tone for determining chromatic-dispersion values.

In another embodiment, the detector 650 may simply produce a local signal representing the probing tone transmitted at source, and determine the phase shift of the received probing tone from the local signal during each of the four intervals. For example, if the probing tone is a pure sinusoidal signal of frequency f hertz (angular frequency $\omega=2\pi f$), the detected envelope of the total optical signal is filtered to remove the payload components then multiplied by the local signal and the result is integrated to determine the phase during each interval. To ensure that the local signal precisely tracks the probing tone generated at probing optical signal generator 135, the local signal generator at a probing-signal detector 650 employs techniques based on a digital phase-locked-loop.

The frequency f of the probing tone is selected to meet certain criteria, one of which is that the expected largest differential propagation delay $\Delta^*$ for any two wavelengths along the path under test does not exceed half the period 1/f of the probing tone, i.e., the product $f\Delta^*$ does not exceed 0.5. Thus, the phase change between any two intervals of the probing optical signal is kept below $\pi$ radians. To determine both the magnitude and quadrant of the phase change, quadrature components of the local signal are generated. Without loss of generality, the local-signal components may be represented as $Q\cos(\omega t)$ and $Q\sin(\omega t)$, where Q is an arbitrary magnitude; preferably, the amplitudes of the quadrature components of the local signal are selected to be equal.

The probing tone during the four intervals of the exemplary probing signal of FIG. 12 may be represented as $\alpha_1\cos(\omega t+\theta_1)$, $\alpha_2\cos(\omega t+\theta_2)$, $\alpha_3\cos(\omega t+\theta_3)$, and $\alpha_4\cos(\omega t+\theta_4)$, where the magnitude $\alpha_j$, $1 \leq j \leq 4$, is determined by the magnitude of the probing signal produced by the probing-signal generator, the attenuation along the path, and any amplification at transport modules. With the spectral content of the signatures properly separated from the spectral content of the probing tone, multiplication of the envelope of the received probing optical signal with the quadrature components of the local signal followed by an integration (filtering) process yields the values and quadrants of the four angles $\theta_1, \theta_2, \theta_3, \theta_4$. In particular, multiplication of the envelope with $Q\cos(\omega t)$, followed by integration, yields: $\beta_1\cos(\theta_1)$, $\beta_2\cos(\theta_2)$, $\beta_3\cos(\theta_3)$, and $\beta_4\cos(\theta_4)$, where $\beta_j$ is proportional to $\alpha_j Q/2$, $1 \leq j \leq 4$. Multiplication of the envelope with $Q\sin(\omega t)$, followed by integration, yields: $-\beta_1\sin(\theta_1)$, $-\beta_2\sin(\theta_2)$, $-\beta_3\sin(\theta_3)$, and $-\beta_4\sin(\theta_4)$. Thus the phase values $\theta_1, \theta_2, \theta_3, \theta_4$, can be determined. The difference of chromatic-dispersion values between any two of the four wavelengths, $\lambda_j$, and $\lambda_k$, $1 \leq j \leq 4$, $1 \leq k \leq 4$, is proportional to the phase difference $(\theta_k - \theta_j)$.

The use of wavelength modulation of the probing signal where the wavelength remains unchanged during each interval within the period T greatly simplifies the process of determining the phase shift of the probing tone as a function of wavelength of the probing signal as will be clear from the following. The period T of the probing signal may be logically divided into a large number of "time windows" 1914, hereinafter referenced as "windows" for brevity, each of duration $\sigma$, and each of the four intervals comprises an integer number of windows. Each window 1914 encompasses a large number probing-tone cycles, i.e., $\sigma \gg (1/f)$. For example, $\sigma=(8192/f)$, f being the frequency of the probing tone. With a probing tone of 1 mega-hertz, the window duration $\sigma$ is approximately 8 milliseconds. A probing-signal period T of 8 seconds, for example, would include approximately 1000 windows.

For clarity of illustration, the period T is divided into only 32 windows (FIG. 19) with the durations $\tau_1, \tau_2, \tau_3$, and $\tau_4$ of the four time intervals selected to be equal. In a first arrangement, the boundaries of each of the four intervals are perfectly aligned with respective windows. Thus, each window 1914 is fully contained within one of the four intervals and at the end of each window the probing-signal detector 650 determines a phase value 1916 for a corresponding interval. In a second arrangement, the boundaries of the four intervals may not necessarily be aligned with respective windows. Thus, one window, identified by the reference numeral 1922 instead of 1914, in each interval may straddle two intervals. The phase value 1921 determined from the envelope data during a straddling window may be discarded. The phase values 1916 determined from processing the probing tone during time periods 1920, each period 1920 containing windows 1914 within one of the four intervals, are used for estimating $\theta_1, \theta_2, \theta_3$, and $\theta_4$. The phase values 1916 within an interval $\tau_1, \tau_2, \tau_3$, or $\tau_4$ may not be equal due to measurement errors. The mean value of measurements 1916 within a period yields an accurate estimate of the corresponding phase. Analysis of the envelope data during each of the remaining seven windows of an interval yields the phase value of the probing tone during the interval.

The detected envelope of the combined optical signal, including operational optical signals and the probing optical signal, is sampled at a rate exceeding the Nyquist rate, i.e., exceeding double the highest frequency content in the envelope. For example, with a probing tone of 1 mega-hertz, and with signatures of the operational optical signals occupying a spectral band below 2 mega-hertz, the sampling rate preferably exceeds 4 mega samples per second.

Various methods based on digital signal processing may be applied for processing the envelope of the optical signal 1112. For example, methods and apparatus for performing fast real-time Fourier transform (FFT) for a sizeable series are described in the following patents issued to the present applicant and incorporated herein by reference:

U.S. Pat. No. 6,963,892 (Jin et al) "Real-time method and apparatus for performing a large size Fast Fourier Transform"; and U.S. Pat. No. 6,732,058 (Jin et al) "Method and apparatus for computation reduction for tone detection".

Fast Fourier Transform (FFT) may be used to determine the spectrum (both the amplitude and phase) during each window. The mean phase value determined over an interval is an accurate estimate of the phase during the interval.

Identifying the Start of a Probing Optical Cycle

A probing signal detector 650 measures phase values 1916 as described above with reference to FIG. 19. However, to relate a measurement 1916 to a specific interval in the cycle (of duration T) of a probing optical signal received at the probing signal detector 650, the instants corresponding to the start of successive cycles must be known. Either of two methods of identifying the start of a cycle or interval, according to the present invention, may be used. According to a first method, the generated probing optical signal at the probing signal generator of FIG. 7 or FIG. 8 is suppressed for a prescribed suppression period of time immediately following the start of each cycle. The discontinuity may then be identified from magnitude measurements at a probing-signal detector receiving the probing optical signal. With each interval selected to have a duration of an integer multiple of the duration σ of a window 1914, measurements 1916 can be related to the corresponding interval, hence to the corresponding wavelength $\lambda_j$, $1 \leq j \leq m$. The suppression period is preferably selected to equal or exceed twice the duration σ of a window to facilitate detection of the onset of suppression, which is followed by wavelength transition. The measured phase values during the suppression period are preferably discarded.

Figure 20:
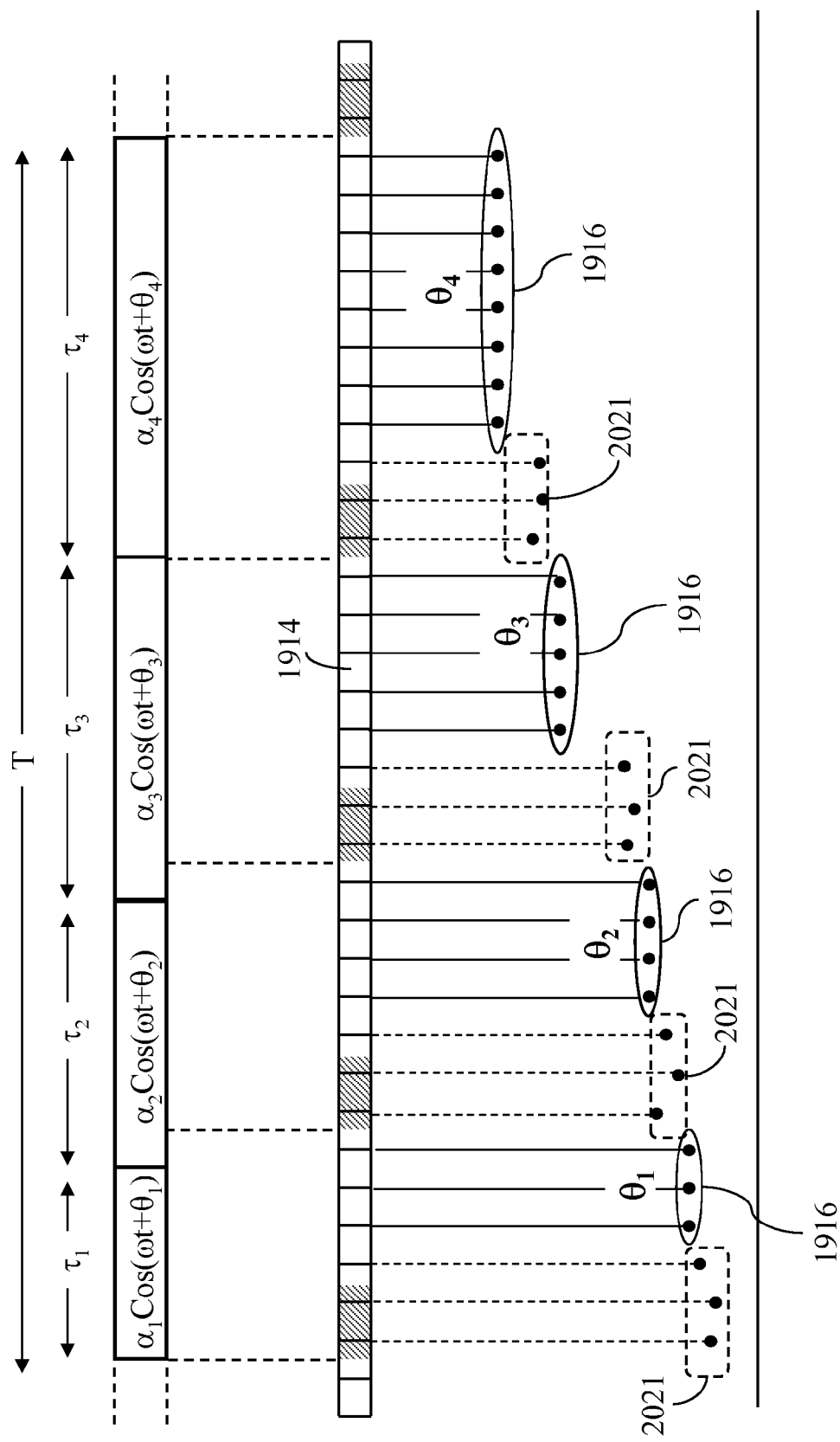
FIG. 20 illustrates the method of FIG. 19 where the time intervals are selected to be unequal to facilitate associating a phase measurement with an interval, in accordance with an embodiment of the present invention.

According to a second method, the generated probing optical signal at the probing signal generator of FIG. 7 or FIG. 8 is suppressed for a prescribed period of time immediately following the start of each interval within each cycle. The time intervals $\tau_1$, $\tau_2$, $\tau_3$, and $\tau_4$ may be selected to be of distinctly different values. Thus, the measurements 1916 within one interval can be distinguished from measurements 1916 within any other interval. The second method is illustrated in FIG. 20 where the four intervals are selected so that the four intervals have durations of 6, 7, 8, and 11 windows 1914, instead of 8 windows per interval as in the arrangement of FIG. 19. The suppression period is preferably selected to be at least equal to twice the duration σ of one window as described above. The measurements 2021 around each suppressed-signal period can be identified and discarded. The numbers of valid measurements 1916 in the four intervals are 3, 4, 5, and 8, respectively.

Thus, two methods may be used for measuring chromatic dispersion as described above. The first is based on multiplication of the envelope of the optical signal received at a probing-signal detector by a local signal representing the probing tone transmitted at source, and the second is based on computing the Fourier transform of the envelope, using FFT for example. The first method determines $\cos(\theta_j)$, and $\sin(\theta_j)$, $1 \leq j \leq 4$, which enable determining the value and quadrant of each phase $(\theta_j)$. The second method determines the magnitude and phase of each component in the spectrum of the envelope. With the use of probing signal suppression for selected time windows, as described above, measured values of chromatic dispersion can be associated with one of the wavelengths $\lambda_1, \ldots, \lambda_m$. Thus, both methods yield the magnitude and sign of chromatic dispersion. With the knowledge of the sign of chromatic dispersion, both under-compensation and excessive over-compensation of dispersion can be prevented.

Figure 21:
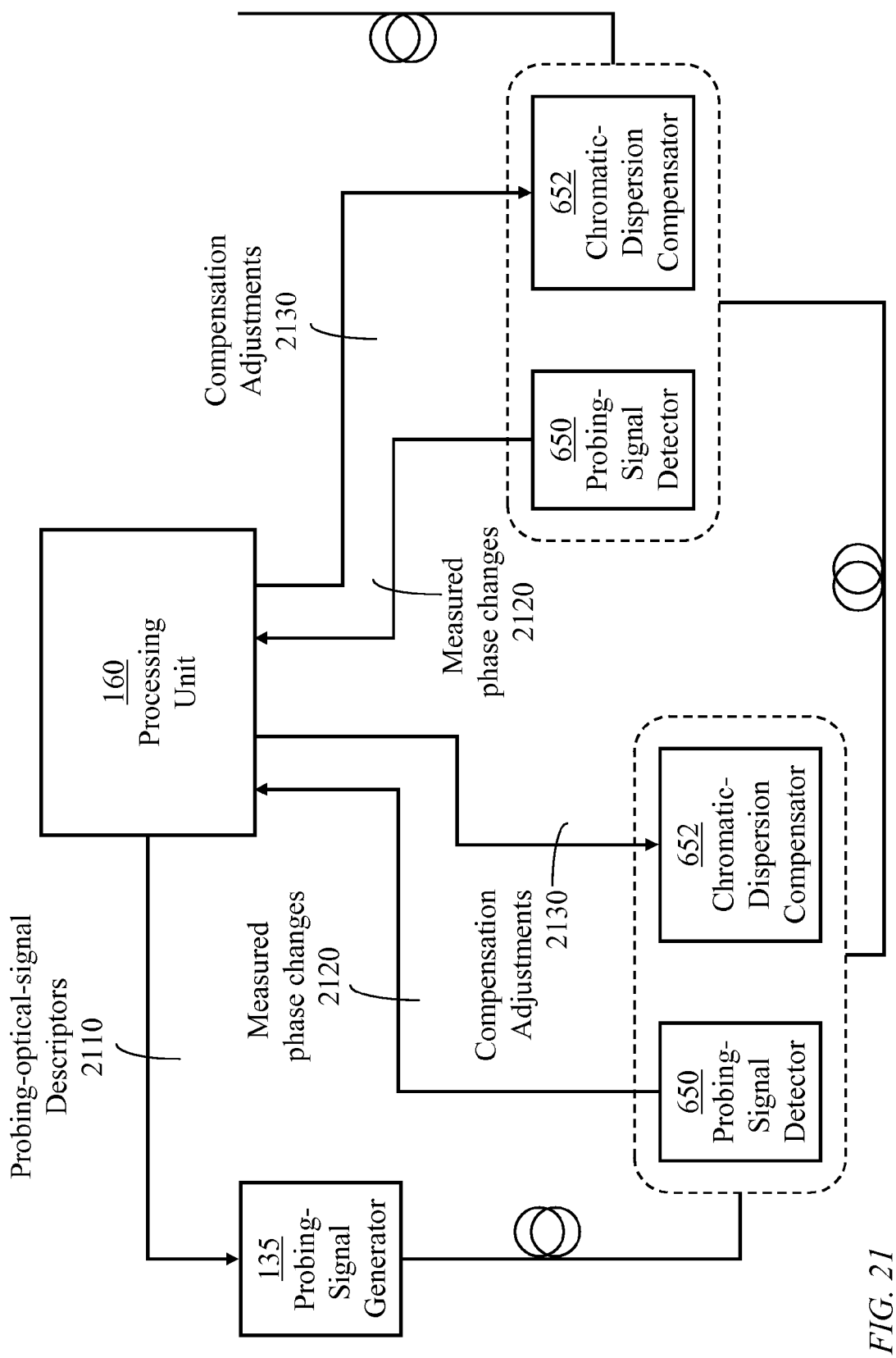
FIG. 21 illustrates control data communication to and from a processing unit, in accordance with an embodiment of the present invention.

FIG. 21 summarizes control data communication to and from a processing unit 160. A processing unit 160 specifies a probing optical signal and sends descriptors 2110 of the probing optical signal to a respective switching unit 120, or an add-drop multiplexer 320, hosting a probing optical-signal generator 135. The processing unit 160 receives chromatic-dispersion measurements 2120 from transport modules hosting probing signal detectors 650. The measurements 2120 may be in the form of phase changes corresponding to segments of different wavelength in the optical probing signal, or chromatic-dispersion values computed at the probing signal detectors 650. The processing unit 160 assembles data related to different spans in the network under consideration, determines appropriate compensation adjustments, if any, and communicates results 2130 to transport modules 128 (FIG. 1) or 328 (FIG. 3) hosting chromatic-dispersion compensators.

Thus, the net chromatic dispersion of multiple fiber spans in the optical network can be concurrently and efficiently measured by using a single probing-signal generator for a light path that traverses the fiber spans. The test wavelengths $\{\lambda_1, \ldots, \lambda_m\}$ may be chosen to be unused ITU wavelengths (or off-grid wavelengths) so that the dispersion measurement can be done in-service, without interrupting traffic already in progress.

The measurement of the chromatic dispersion over each fiber span enables:

(i) determining chromatic dispersion for all possible light-path connections;

(ii) selecting an appropriate dispersion compensator for a particular span, either from a set of pre-engineered dispersion-compensation devices or through a variable or switched dispersion compensator. This greatly reduces the operational complexity of commissioning a network. Alternatively, the measurements may serve to verify that appropriate chromatic-dispersion compensation has been applied; and (iii) performing real-time, in-service, adjustment of tunable dispersion compensators. Consequently, a network operator may decide to upgrade a link to higher-data-rate designation without disturbing traffic in progress. This adaptation may be combined with bit-error measurements for further fine-tuning of residual dispersion.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A system for measuring chromatic dispersion in a link of an optical network, comprising:
   a processing unit;
   a probing-signal generator comprising:
      at least one laser source for producing a probing optical signal where during each of successive time intervals within a prescribed period said probing optical signal has a predefined wavelength selected from a set of prescribed wavelengths; and
      an amplitude modulator for intensity modulating said probing optical signal with a periodic tone of a predetermined frequency;
   a plurality of probing-signal detectors, each detector comprising:
      a demodulator for detecting segments of said periodic tone during successive time intervals;
      a circuit for measuring phase differences between said segments; and
      a transmitter for sending an output of said circuit to said processing unit;
   wherein said processing unit determines chromatic dispersion between wavelengths corresponding to successive time intervals according to:
      said phase differences;
      said set of prescribed wavelengths; and
      said predetermined frequency.

2. The system of claim 1 further comprising a plurality of adjustable chromatic-dispersion compensators each communicatively coupled to said processing unit for receiving target compensation values.

3. The system of claim 1 wherein said at least one laser source is a tunable laser source.

4. The system of claim 1 wherein said at least one laser source comprises multiple laser sources and a selector to select an output of one of said multiple laser sources during each of said successive time intervals.

5. The system of claim 1 wherein said periodic tone is selected to have one of:
   a sinusoidal waveform;
   a square waveform; and
   a saw-tooth waveform.

6. A network comprising:
   a plurality of wavelength-channel switching nodes;
   a plurality of transport modules;
   a plurality of fiber-optic links interconnecting said switching nodes, each link comprising at least one span, each span terminating in one of said transport modules;
   a plurality of probing-signal generators associated with selected switching nodes;
   a plurality of probing-signal detectors, each detector collocated with a respective transport module;
   a first controller for directing a first probing signal, produced by a first probing-signal generator associated with a first switching node from among said selected switching nodes, to a first route traversing at least one detector; and
   a processing unit for processing outputs of said at least one detector.

7. The network of claim 6 wherein said first probing-signal generator comprises:
   a tunable laser for producing a periodic optical signal where during each of successive time intervals within a prescribed period said periodic optical signal has a predefined wavelength selected from an ordered set of prescribed wavelengths; and
   a modulator for intensity modulating said periodic optical signal with a sinusoidal tone of a predetermined frequency.

8. The network of claim 7 wherein said each detector comprises:
   a demodulator for detecting segments of said sinusoidal tone during said successive time intervals;
   a circuit for measuring phase differences between said segments; and
   a transmitter for sending an output of said circuit to said processing unit.

9. The network of claim 8 wherein said processing unit determines chromatic dispersion between wavelengths corresponding to said successive time intervals according to said phase differences, said set of prescribed wavelengths, and said predetermined frequency.

10. The network of claim 9 wherein each transport module comprises a detector, from among said plurality of probing-signal detectors, and said processing unit determines chromatic dispersion for each span along said first route.

11. The network of claim 8 wherein said processing unit determines cumulative chromatic dispersion along overlapping parts of said first route from said first switching node to each of said at least one detector.

12. The network of claim 9 further comprising a plurality of adjustable chromatic-dispersion compensators each collocated with a respective transport module in said network and communicatively coupled to said processing unit for receiving target compensation values.

13. The network of claim 6 wherein said first controller directs a second probing signal, produced by said first probing-signal generator to a second route traversing at least one detector.

14. The network of claim 6 wherein said first controller directs a second probing signal, produced by a second probing-signal generator associated with said first switching node to a second route traversing at least one detector.

15. The network of claim 14 wherein said second probing signal is sent concurrently with said first probing signal.

16. The network of claim 14 wherein said first controller is collocated with said first switching node.

17. The network of claim 6 further comprising a second controller for directing a second probing signal, produced by a second probing-signal generator associated with a second switching node from among said selected switching nodes to a second route traversing at least one detector.

18. The network of claim 17 wherein said second controller is collocated with said second switching node.

19. The network of claim 17 wherein said second route and said first route are non-intersecting and wherein said second probing signal and said first probing signal are send concurrently.

20. The network of claim 6 further comprising optical supervisory channels for communicating control data between each switching node, of said selected switching nodes, and transport modules along routes emanating from said each switching node.

21. The network of claim 6 further comprising:
a communication path from each of said selected switching nodes to said processing unit; and
a communication path from each of said transport modules to said processing unit.

22. The network of claim 21 wherein said communication path from each of said selected switching nodes and said communication path from each of said transport modules are switched paths in a data network.

23. A method for distributed measurement of chromatic-dispersion in a network comprising a plurality of optical switching nodes, the method comprising:
sending from a first switching node, from among said plurality of optical switching nodes, a probing optical signal combined with operational optical signals, said probing optical signal comprising segments each having a selected wavelength, from a set of wavelengths, during successive time intervals, said optical signal modulated by a probing tone of a periodic waveform and a predetermined frequency;
detecting, at a probing-signal detector placed along a path from said first switching node, said probing tone and determining phase differences between successive parts of said probing tone corresponding to said segments; and
determining, at a processing unit coupled to said first optical switching node and to said probing-signal detector, chromatic dispersion along said path between said first switching node and said probing-signal detector for pairs of said wavelengths according to:
said phase differences; and
said predetermined frequency.

24. The method of claim 23 further comprising repeating the steps of detecting and determining chromatic dispersion for each of a plurality of probing-signal detectors placed along said path.

25. The method of claim 24 further comprising a step of determining chromatic-dispersion adjustments at selected points along said path based on chromatic-dispersion values determined at said plurality of probing-signal detectors.

26. The method of claim 23 wherein said set of wavelengths are spectrally distinct from said operational optical signals.

27. The method of claim 23 wherein said probing optical signal is periodic with a sequence of m>1 segments repeated over periods of duration T each.

28. The method of claim 27 wherein said m>1 segments occupy respective time intervals $\tau_j$, $1 \leq j \leq m$, each time interval comprising a respective number of time windows each having a time-window duration $\sigma$.

29. The method of claim 28 further comprising performing a phase-detection process, at said probing-signal detector, to determine phase values of said probing tone during successive time windows.

30. The method of claim 29 further comprising:
suppressing, at said first switching node, said probing optical signal for a duration equal to a predefined integer multiple of said time-window duration $\sigma$ at the starting instant of each period of duration T; and
said probing-signal detector:
identifying a starting instant of said each period based on amplitude change of said probing tone;
identifying a wavelength corresponding to each segment according to said starting instant and a predefined assignment of wavelengths to said sequence of m>1 segments;
associating each of said phase values with a wavelength from said set of wavelengths; and
processing phase values associated with each wavelength selected from said set of wavelengths, excluding phase values in the vicinity of said starting instant, to determine a phase estimator for each of said time intervals.

31. The method of claim 29 further comprising:
selecting said time intervals $\tau_j$, $1 \leq j \leq m$, to have distinctly different values;
suppressing said probing signal, at said first switching node, for a duration equal to a predefined integer multiple of said time-window duration $\sigma$ at the start of each of said time intervals;
identifying starting instants of said time intervals based on amplitude change of said probing tone;
identifying, at said probing-signal detector, each segment of said probing optical signal according to time lapse between successive starting instants of said time intervals;
associating each of said phase values with a wavelength from said set of wavelengths; and
processing phase values associated with each of said time intervals, excluding phase values in the vicinity of each of said starting instants, to determine a phase estimator for each of said time intervals.

32. The method of claim 29 wherein said step of detecting comprises further steps of:
amplitude demodulation to produce an envelope of a sum of said probing optical signal and said operational optical signals; and
filtering said envelope to retain spectral components in a frequency band containing said probing signal.

33. The method of claim 32 wherein said phase-detection process comprises steps of:
generating at said probing-signal detector orthogonal components of a reference periodic signal of a frequency equal to said predetermined frequency;
multiplying said envelope with each said orthogonal components; and
integrating a product of said multiplying over each of successive time windows to determine a magnitude of said probing tone and a phase difference between said probing tone and said reference periodic signal for individual time windows.

34. The method of claim 32 wherein said phase-detection process comprises steps of:
determining a Fourier Transform of said envelope over individual time windows; and
determining a magnitude and phase of a spectral component corresponding to said probing tone during each said individual time window.

* * * * *